United States Patent
Hwang

(10) Patent No.: US 11,216,136 B2
(45) Date of Patent: Jan. 4, 2022

(54) TOUCH SENSOR AND DISPLAY DEVICE

(71) Applicant: Samsung Display Co., Ltd., Yongin-Si (KR)

(72) Inventor: Seong Mo Hwang, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/673,373

(22) Filed: Nov. 4, 2019

(65) Prior Publication Data

US 2020/0293149 A1 Sep. 17, 2020

(30) Foreign Application Priority Data

Mar. 12, 2019 (KR) ........................ 10-2019-0027846

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05); *G06F 2203/04105* (2013.01); *G06F 2203/04111* (2013.01); *G06F 2203/04112* (2013.01)

(58) Field of Classification Search
CPC .......... G06F 3/044; G06F 3/041; G06F 3/045; G06F 3/0446; G01R 27/26; G02F 1/1333
See application file for complete search history.

(56) References Cited

U.S. PATENT DOCUMENTS

| | | | |
|---|---|---|---|
| 7,663,607 B2 | 2/2010 | Hotelling et al. | |
| 9,239,654 B2 | 1/2016 | Jang | |
| 9,690,413 B2 | 6/2017 | Filiz et al. | |
| 10,095,351 B2 | 10/2018 | Ding et al. | |
| 10,209,830 B2 | 2/2019 | Pedder et al. | |
| 2017/0285799 A1* | 10/2017 | Iuchi | G06F 3/04164 |
| 2017/0285864 A1* | 10/2017 | Pedder | H01L 27/323 |
| 2018/0074638 A1* | 3/2018 | Chiang | G06F 3/045 |
| 2018/0085061 A1* | 3/2018 | Heisig | A61B 5/4082 |
| 2018/0299335 A1* | 10/2018 | Wong | B81B 7/02 |
| 2019/0004659 A1* | 1/2019 | Bian | G06F 3/041 |
| 2019/0178730 A1* | 6/2019 | Lee | H01L 41/125 |
| 2020/0167029 A1* | 5/2020 | Chi | G06F 3/0414 |

FOREIGN PATENT DOCUMENTS

| | | |
|---|---|---|
| KR | 10-1233479 | 2/2013 |
| KR | 10-1373044 | 3/2014 |
| KR | 10-1811417 | 12/2017 |

* cited by examiner

*Primary Examiner* — Pegeman Karimi
(74) *Attorney, Agent, or Firm* — H.C. Park & Associates, PLC

(57) ABSTRACT

A touch sensor includes: a base layer; a plurality of electrode members disposed on the base layer, the plurality of electrode members configured to sense a touch; and at least one strain gauge disposed on the base layer, the at least one strain gauge configured to sense a pressure of a touch input, wherein the plurality of electrode members and the strain gauge are disposed in a single layer.

21 Claims, 26 Drawing Sheets

151_1

151_2

151_3

TOUCH SENSOR AND DISPLAY DEVICE

CROSS-REFERENCE TO RELATED APPLICATION

This application claims priority to Korean Patent Application No. 10-2019-0027846, filed on Mar. 12, 2019, which is hereby incorporated for all purposes as if fully set forth herein.

BACKGROUND

Field

Exemplary embodiments of the invention relate generally to a touch sensor and a display device including the same.

Discussion of the Background

An electronic device such as a smart phone, a digital camera, a laptop computer, a navigation device and a smart TV includes a display device for displaying an image. The display device includes a display panel for generating and displaying an image and various input devices.

Recently, a touch sensor which recognizes a touch input is widely applied to a display device mainly in a smart phone or a tablet PC. A touch sensor with the convenience of a touch-screen interface has a tendency to replace a conventional keypad, which is a physical input device.

Many studies have been conducted to apply a pressure sensor that detects the intensity of a pressure, in addition to a touch sensor that detects a touch position, to a display device for use as a substitute for a conventional physical button.

The above information disclosed in this Background section is only for understanding of the background of the inventive concepts, and, therefore, it may contain information that does not constitute prior art.

SUMMARY

Devices constructed according to exemplary embodiments of the invention are capable of sensing the position of the touch and the pressure of the touch.

Additional features of the inventive concepts will be set forth in the description which follows, and in part will be apparent from the description, or may be learned by practice of the inventive concepts.

According to one or more exemplary embodiments of the invention, a touch sensor includes: a base layer; a plurality of electrode members disposed on the base layer, the plurality of electrode members configured to sense a touch; and at least one strain gauge disposed on the base layer, the at least one strain gauge configured to sense a pressure of a touch input, wherein the plurality of electrode members and the strain gauge are disposed in a single layer.

The plurality of electrode members may be arranged in an island shape, and the strain gauge may be spaced apart from each of the plurality of electrode members in a plan view.

The strain gauge may include at least one resistance line, the at least one resistance line may be located between the plurality of electrode members in the plan view.

The strain gauge may include a first resistance line and a second resistance line disposed to be spaced apart from each other in a first direction, and wherein the strain gauge further may includes a connection line electrically connecting one distal end of the first resistance line to one distal end of the second resistance line.

The connection line may be located between the plurality of electrode members which are spaced apart in a second direction intersecting the first direction.

The touch sensor may further include: a pad portion including: a plurality of pads; a first signal line electrically connecting the other distal end of the first resistance line to the pad portion; and a second signal line electrically connecting the other distal end of the second resistance line to the pad portion, wherein the first signal line and the second signal line may extend in the first direction and are separated from each other in the second direction.

The touch sensor may further include: a temperature compensation portion disposed between the base layer and the strain gauge, wherein the temperature compensation portion may include a temperature compensating resistance line overlapping the resistance line in a thickness direction.

The touch sensor may further include an insulating layer disposed between the temperature compensating resistance line and the resistance line, wherein the temperature compensating resistance line may have the same shape as that of the resistance line.

The touch sensor may further include a Wheatstone bridge circuit portion electrically connected to the strain gauge, the Wheatstone bridge circuit portion including: a first node to which a driving voltage is applied; a second node connected to the ground; a first output node; and a second output node, wherein one distal end of the strain gauge is electrically connected to the first node, and the other distal end of the strain gauge is electrically connected to the first output node.

The Wheatstone bridge circuit portion may be electrically connected to a temperature compensating pattern, and one distal end of the temperature compensating pattern is electrically connected to one of the first output node and the first node.

A resistance value of the temperature compensating pattern may be configured to have a resistance value equal to that of the strain gauge in response to the touch input not being applied.

The touch sensor may be configured to sense a position of the touch input based on a self-capacitance change in the plurality of electrodes generated in response to a touch input, and wherein the touch sensor may be configured to sense the pressure of the touch input based on a resistance value change of the strain gauge generated in response to the touch input.

The plurality of electrode members may include a plurality of first electrode members which is a sensing electrode and a second electrode member which is a driving electrode, the plurality of first electrode members may be spaced apart in a first direction, and the second electrode member may include a first unit and a second unit which extend in the first direction and are spaced apart in a second direction perpendicular to the first direction.

The first unit may include: a first connection portion which extends in the first direction; and a first protrusion portion which protrudes from the first connection portion in the second direction, wherein the second unit may include: a second connection portion which extends in the first direction; and a second protrusion portion which protrudes from the second connection portion in a third direction opposite to the second direction, and wherein the first protrusion portion and the second protrusion portion may be alternately arranged in the first direction, and the first protrusion portion and the second protrusion portion are spaced apart in the first direction.

The first protrusion portion and the second protrusion portion may overlap each other in the first direction.

The strain gauge may include at least one resistance line, the at least one resistance line being located between the first protrusion portion and the second protrusion portion, and spaced apart from the first and second protrusion portions.

The touch sensor may further include a temperature compensation portion disposed between the base layer and the strain gauge, the temperature compensation portion may include a temperature compensating resistance line, and wherein the temperature compensating resistance line overlaps the resistance line in a thickness direction.

The touch sensor may further include an insulating layer disposed between the temperature compensating resistance line and the resistance line, wherein the temperature compensating resistance line may have the same shape as that of the resistance line.

The touch sensor may be configured to sense a position of the touch input based on a mutual capacitance change between the plurality of first electrode members and the second electrode member generated in response to a touch input, and wherein the touch sensor may be configured to sense the pressure of the touch input based on a resistance value change of the strain gauge generated in response to the touch input.

According to one or more exemplary embodiments of the invention, a display device includes: a base substrate; a light emitting element disposed on the base substrate; a thin film encapsulation layer disposed on the light emitting element; a plurality of first touch electrodes disposed on the thin film encapsulation layer and electrically connected to each other along a first direction, each of the plurality of first touch electrodes including a first opening; a plurality of electrode members disposed on the thin film encapsulation layer and configured to sense a touch; and at least one strain gauge disposed on the same layer as the plurality of electrode members and configured to sense a pressure, wherein each of the plurality of electrode members is disposed on the same layer, and each of the plurality of electrode members and the at least one strain gauge includes mesh holes.

According to the exemplary embodiments of the present disclosure, it is possible to provide a touch sensor with a simplified process and improved production efficiency by implementing a sensing pattern capable of sensing the position of the touch input and the pressure of the touch input as a single layer, and a display device including the same.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION EMBODIMENT

Figure 1:
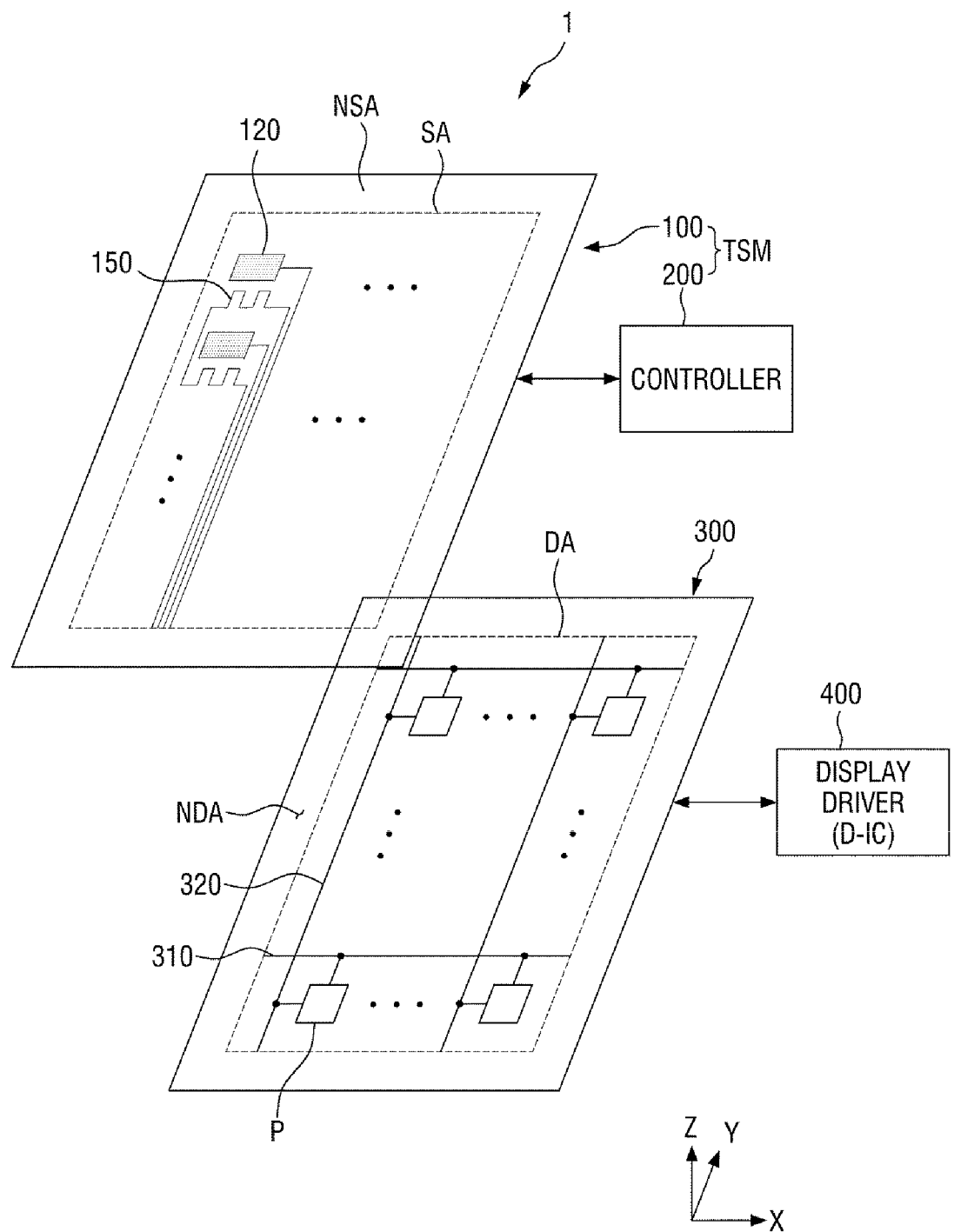
FIG. 1 schematically shows a display device according to one exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z-axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Exemplary embodiments of the present disclosure will hereinafter be described with reference to the accompanying drawings.

FIG. 1 schematically shows a display device according to one exemplary embodiment.

Figure 2:
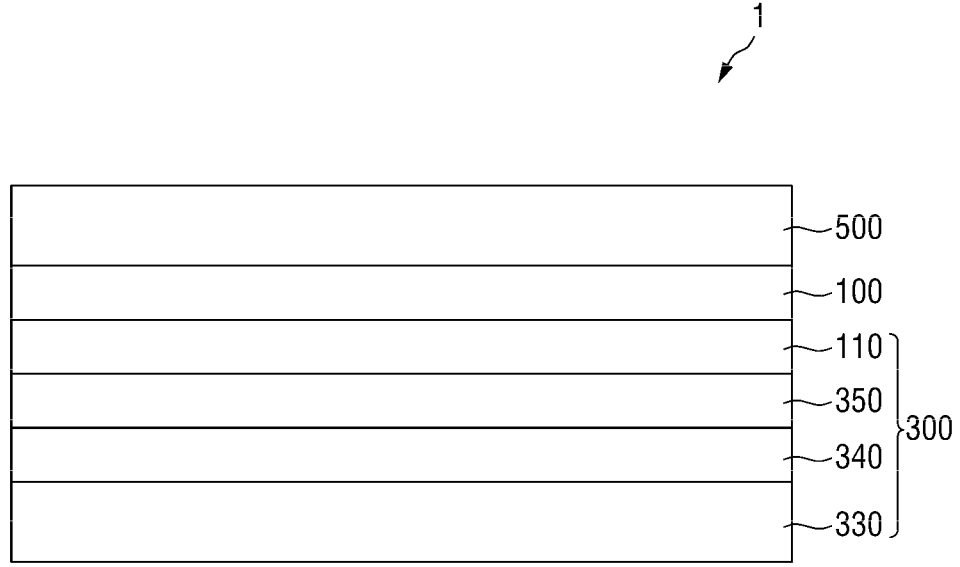
FIG. 2 is a schematic partial cross-sectional view illustrating the display device of FIG. 1.
Figure 3:
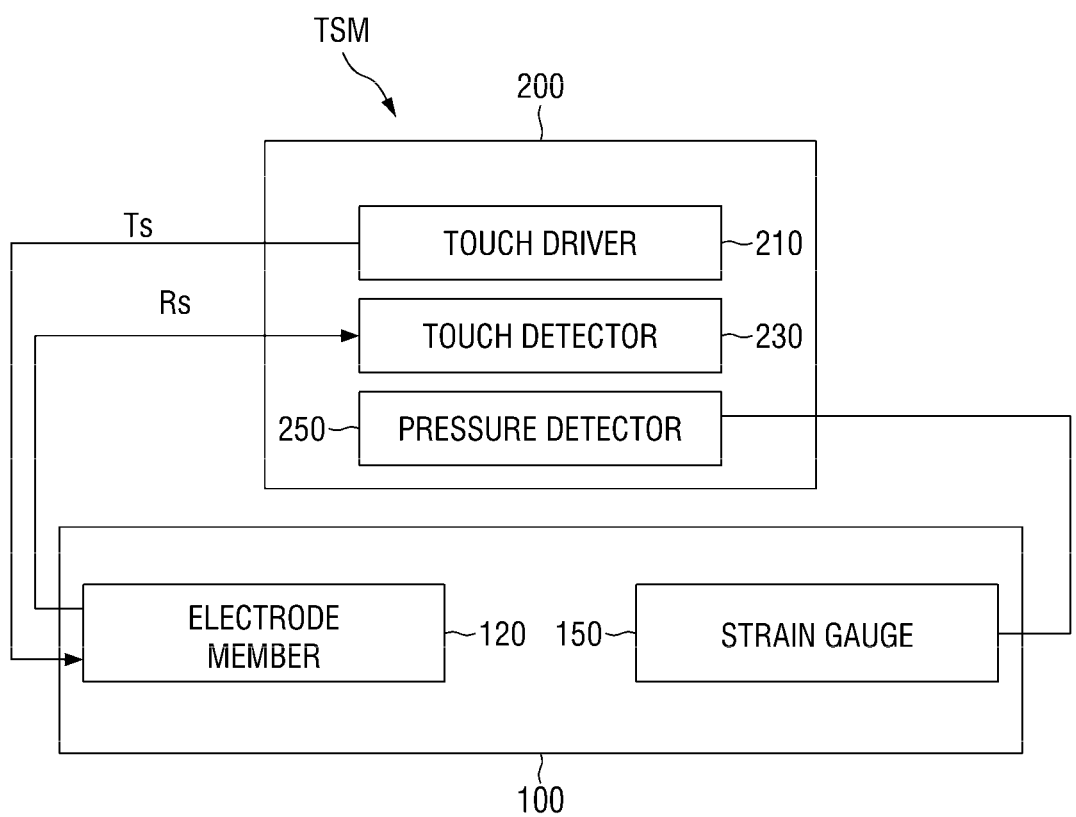
FIG. 3 is a block diagram of a touch sensor shown in FIG. 1.

FIG. 2 is a schematic partial cross-sectional view illustrating the display device of FIG. 1. FIG. 3 is a block diagram of a touch sensor shown in FIG. 1.

The terms "above," "top" and "upper surface" used herein refer to an upward direction (i.e., a Z-axis direction) with respect to a display panel 300. The terms "below," "bottom" and "lower surface" used herein refer to a downward direction (i.e., a direction opposite to the Z-axis direction) with respect to the display panel 300. Further, "left", "right", "upper" and "lower" indicate directions when the display panel 300 is viewed from the plane. For example, "left" refers to a direction opposite to an X-axis direction, "right" refers to the X-axis direction, "upper" refers to a Y-axis direction, and "lower" refers to a direction opposite to the Y-axis direction.

Referring to FIGS. 1, 2, and 3, a display device 1 of one exemplary embodiment may include a touch sensor TSM, a display panel 300 and a panel driver 400.

In some exemplary embodiments, the touch sensor TSM may include a sensor portion 100 and a controller 200. Although FIG. 1 illustrates that the sensor portion 100 and the display panel 300 are separated from each other, this is merely for convenience of description and the present disclosure is not limited thereto. For example, the sensor portion 100 and the display panel 300 may be integrally formed.

The display panel 300 includes a display area DA and a non-display area NDA surrounding at least one area of the display area DA. The display panel 300 may include a circuit driving layer 340 disposed on a base substrate 330 and a light emitting element 350 disposed on the circuit driving layer 340. The circuit driving layer 340 may include scan lines 310, data lines 320 and a plurality of thin film transistors for driving the light emitting element 350. The display area DA of the circuit driving layer 340 may be provided with a plurality of scan lines 310 and data lines 320 connected to the plurality of pixels P. The non-display area NDA of the circuit driving layer 340 may be provided with various driving signals for driving the pixels P and/or wirings for supplying driving power.

In the present disclosure, the type of the display panel 300 is not particularly limited. For example, the display panel 300 may be a self-luminous display panel such as an organic light emitting diode (OLED) display panel, a quantum dot light emitting display (QLED) panel, a micro-LED display panel, a nano-LED display panel, and the like. Alternatively, the display panel 300 may be a non-luminous display panel such as a liquid crystal display (LCD) panel, an electrophoretic display (EPD) panel and an electro-wetting display (EWD) panel. When the display panel 300 is a non-luminous display panel, the display device may further include a back-light unit for supplying light to the display panel 300. Hereinafter, a case where the display panel 300 is an organic light emitting diode display panel will be described as an example for convenience of explanation.

The panel driver 400 is electrically connected to the display panel 300 to supply signals necessary for driving the display panel 300. For example, the panel driver 400 may include at least one of a scan driver for supplying scan signals to the scan lines 310, a data driver for supplying data signals to the data lines 320, and a timing controller for driving the scan driver and the data driver. According to the exemplary embodiment, the scan driver, the data driver and/or the timing controller may be integrated into one display IC (D-IC), but the present disclosure is not limited thereto. For example, in another exemplary embodiment, at least one of the scan driver, the data driver and the timing controller may be integrated or mounted on the display panel 300.

The sensor portion 100 may be provided on at least one area of the display panel 300. For example, the sensor portion 100 may be provided on at least one surface of the display panel 300 so as to overlap the display panel 300 in a third direction (Z-axis direction) which is a thickness direction. For example, the sensor portion 100 may be disposed on one surface (e.g., an upper surface), in a direction in which images are emitted, of both surfaces of the display panel 300. Alternatively, the sensor portion 100 may be formed directly on at least one surface of both surfaces of the display panel 300, or may be formed inside the display panel 300. For example, the sensor portion 100 may be formed directly on an outer surface (e.g., an upper surface of an upper substrate or a lower surface of a lower substrate) of the upper substrate (or a thin film encapsulation layer) or the lower substrate of the display panel 300. Alternatively, the sensor portion 100 may be formed directly on an inner surface (e.g., a lower surface of the upper substrate or an upper surface of the lower substrate) of the upper substrate or the lower substrate.

The sensor portion 100 includes a sensing area SA capable of sensing a touch input and a peripheral area NSA surrounding at least a part of the sensing area SA. According to the exemplary embodiment, the sensing area SA may be disposed to correspond to the display area DA of the display panel 300, and the peripheral area NSA may be disposed to correspond to the non-display area NDA of the display panel 300. For example, the sensing area SA of the sensor portion 100 may overlap the display area DA of the display panel 300 in the third direction (Z-axis direction), and the peripheral area NSA of the sensor portion 100 may overlap the non-display area NDA of the display panel 300 in the third direction (Z-axis direction).

Electrode members 120 for detecting a touch input and strain gauges 150 for detecting a touch pressure may be disposed in the sensing area SA of the sensor portion 100.

The electrode members 120 may be arranged in a matrix form. That is, the electrode members 120 may be arranged in a first direction (X-axis direction) and a second direction (Y-axis direction) perpendicular to the first direction (X-axis direction). The electrode members 120 may have a rectangular shape, but the present disclosure is not limited thereto. In some exemplary embodiments, the electrode members 120 may have various shapes such as a polygonal shape and a circular shape. Further, in some exemplary embodiments, the electrode members 120 may have two or more shapes. For example, some of the electrode members 120 may have a rectangular shape, and the rest of the electrode members 120 may have a circular shape. Also, in some exemplary embodiments, the electrode members 120 may have different areas. For example, when a hole for insertion of a camera or the like is formed in the display device 1, the electrode members 120 around the hole may have a partially removed shape along the hole shape.

The electrode members 120 may be arranged in an island shape to be spaced apart from each other along a first direction (X-axis direction) and a second direction (Y axis direction) intersecting the first direction (X-axis direction). The electrode members 120 may form an electrode row in the first direction (X-axis direction) and may form an electrode column in a second direction (Y-axis direction).

Figure 4:
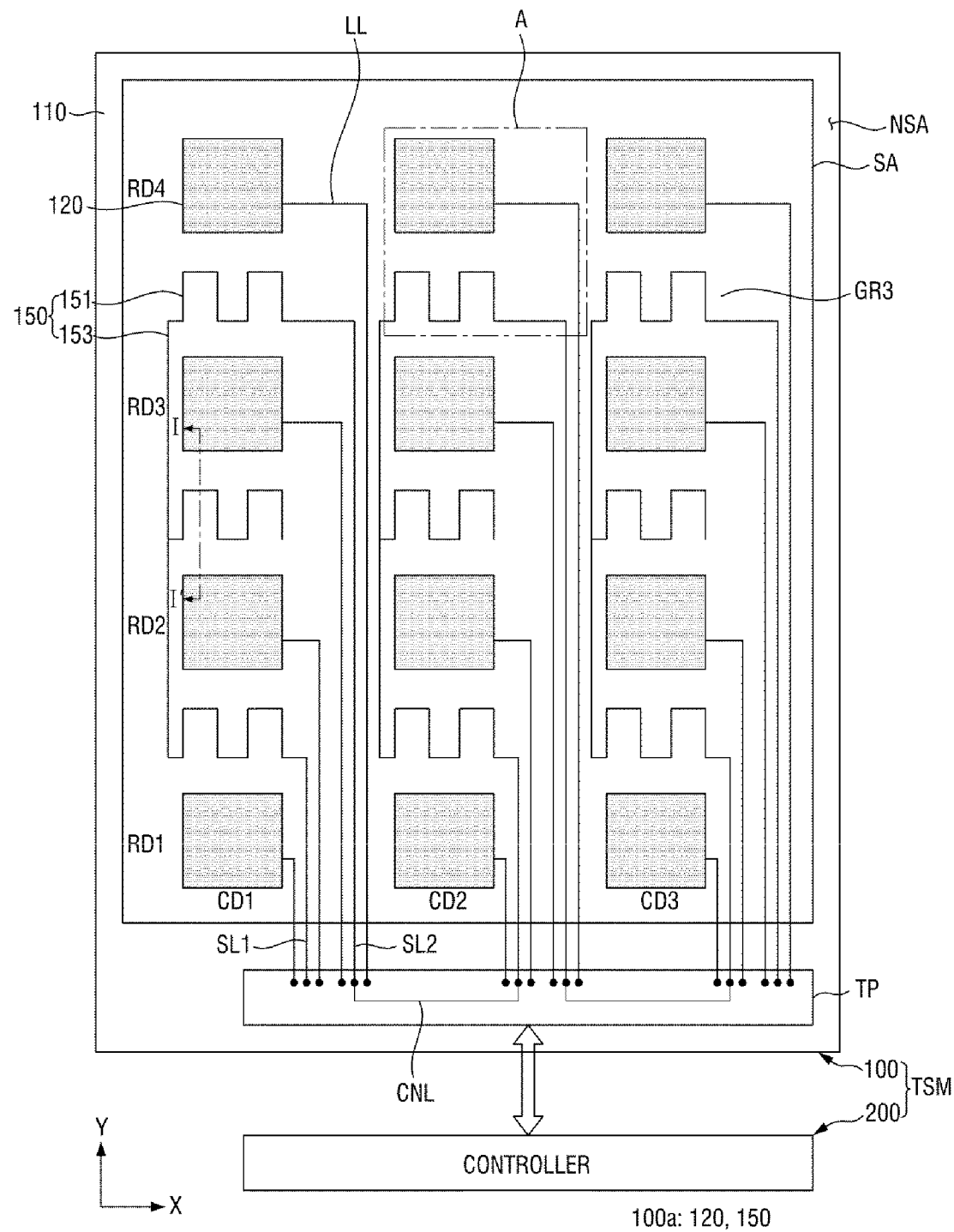
FIG. 4 is a plan view of a touch sensor according to an exemplary embodiment.

The shape, size and/or arrangement direction of the electrode members 120 are not particularly limited. In a non-limiting exemplary embodiment, the electrode members 120 may be configured as shown in FIG. 4, which will be described later.

The electrode members 120 may be electrically connected to the controller 200 and may receive a driving signal Ts for touch detection from the controller 200. Further, the electrode members 120 may output a sensing signal Rs for touch detection to the controller 200.

The electrode members 120 may overlap at least one electrode of the display panel 300. For example, when the display panel 300 is an organic light emitting diode display panel, the electrode members 120 may overlap a cathode electrode of the display panel 300 and the like.

The strain gauges 150 may be disposed between the electrode members 120. For example, the strain gauges 150 may be disposed on the same layer as the electrode members 120, but may be disposed between the electrode members 120 in the second direction (Y-axis direction). The strain gauges 150 may be disposed between the electrode members 120 in the second direction (Y-axis direction), but the present disclosure is not limited thereto. In some exemplary embodiments, the strain gauges 150 may be disposed only between some electrode members of the electrode members 120 in the second direction (Y-axis direction). In some exemplary embodiments, the strain gauges 150 may be disposed between the electrode members 120 in the first direction (X-axis direction).

The strain gauge 150 may change its resistance value by varying its length or cross-sectional area when a force is externally applied. The strain gauges 150 may be electrically isolated from the electrode members 120.

Although not shown in the drawings, a noise sensing electrode member for sensing noise may be further provided in the sensing area SA of the sensor portion 100.

The controller 200 may include a touch driver 210, a touch detector 230 and a pressure detector 250. The controller 200 may be electrically connected to the sensor portion 100 to supply the driving signal Ts to the sensor portion 100, and receive the sensing signal Rs corresponding to the driving signal Ts from the sensor portion 100 to detect the touch position. Further, the controller 200 may be electrically connected to the strain gauges 150 to detect the touch pressure.

The touch driver 210 may provide the driving signal Ts for detecting a touch input to the electrode members 120.

The touch detector 230 may receive the sensing signal Rs corresponding to the driving signal Ts from the electrode members 120 and detect the presence/absence and/or position of the touch input. For example, the electrode members 120 may form a first capacitance with at least one electrode provided in the display panel 300. When a user's finger touches at least one of the electrode members 120, a second capacitance is generated between the finger and the electrode members 120, and the first capacitance is changed by the second capacitance. The changed value of the first capacitance is transmitted to the touch detector 230 through a wiring line LL connected to the electrode member 120 touched by the finger. The touch detector 230 may detect the touch position by checking a sense line LL from which the value of the first capacitance is received. That is, the touch detector 230 can detect the touch position by sensing the amount of change in the self-capacitance formed in the electrode member 120.

The touch detector 230 may include one or more amplification circuits for amplifying the received sensing signal Rs, an analog digital converter which is connected to an output terminal of the amplification circuit, and a processor.

The pressure detector 250 may be electrically connected to the strain gauges 150 and detect the touch pressure based on a change in the resistance value of the strain gauges 150. The pressure detector 250 may include Wheatstone bridge circuit portions electrically connected to the strain gauges 150, and the Whitestone bridge circuit portions may be provided in a number corresponding to the number of the strain gauges 150.

The touch driver 210, the touch detector 230 and the pressure detector 250 may be integrated within a single touch IC, but the present disclosure is not limited thereto. In some exemplary embodiments, the touch driver 210 and the touch detector 230 may be integrated within a single touch IC, and the pressure detector 250 may be located in a portion other than the inside of the touch IC. For example, the pressure detector 250 may be disposed on the display panel 300, or may be disposed on a separate flexible circuit board.

A protective layer 500 may be disposed on the sensor portion 100. The protective layer 500 may include, for example, a window member. The protective layer 500 may be attached onto the sensor portion 100 by an optical transparent adhesive or the like.

Although not shown, the display device 1 may further include an optical member. For example, an optical member such as a polarizing film may be interposed between the sensor portion 100 and the protective layer 500.

Hereinafter, the touch sensor TSM will be described in more detail with reference to FIGS. 4, 5, 6, 7, 8, 9, 10, and 11.

Figure 5:
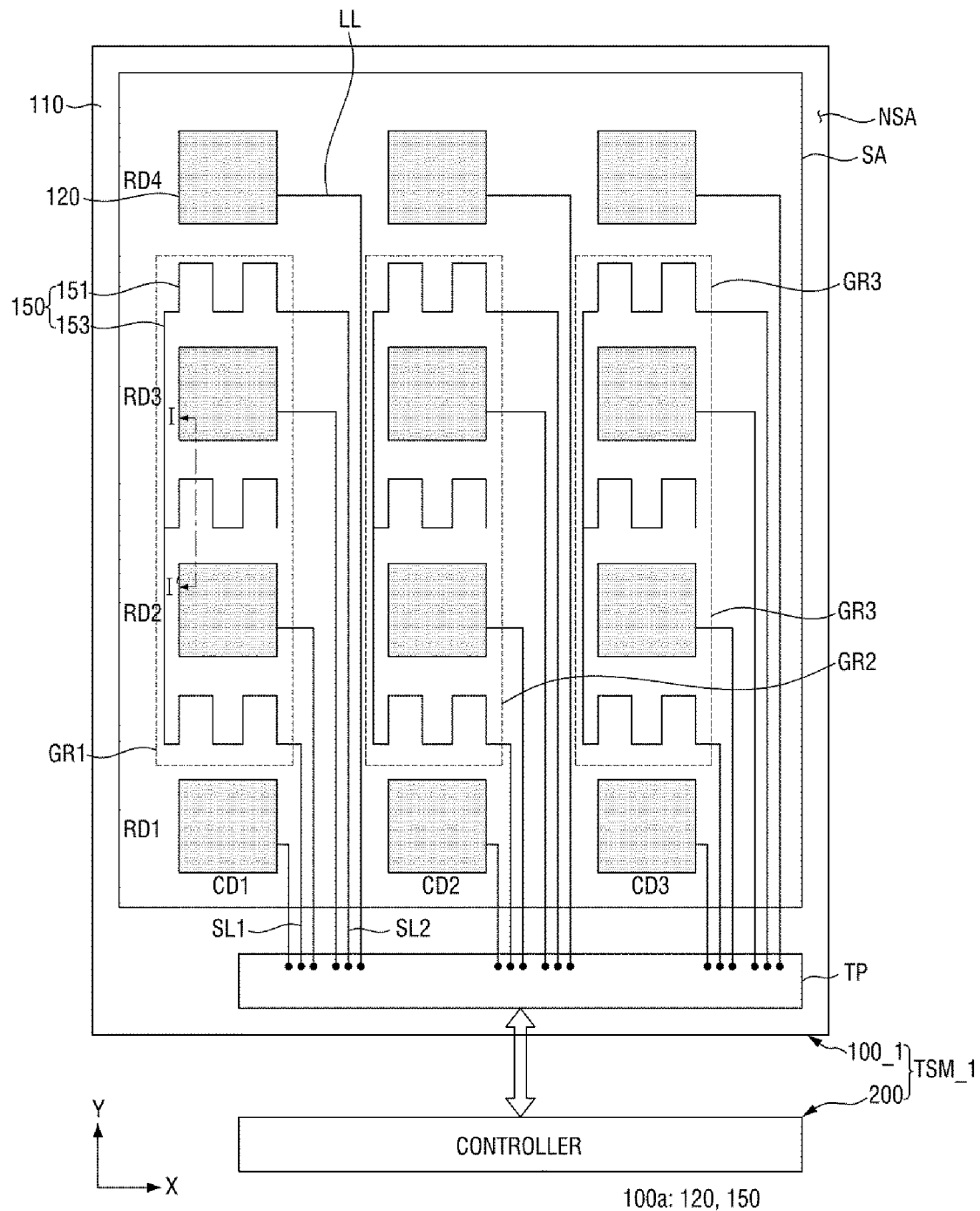
FIG. 5 is a plan view of a touch sensor according to another exemplary embodiment.
Figure 6:
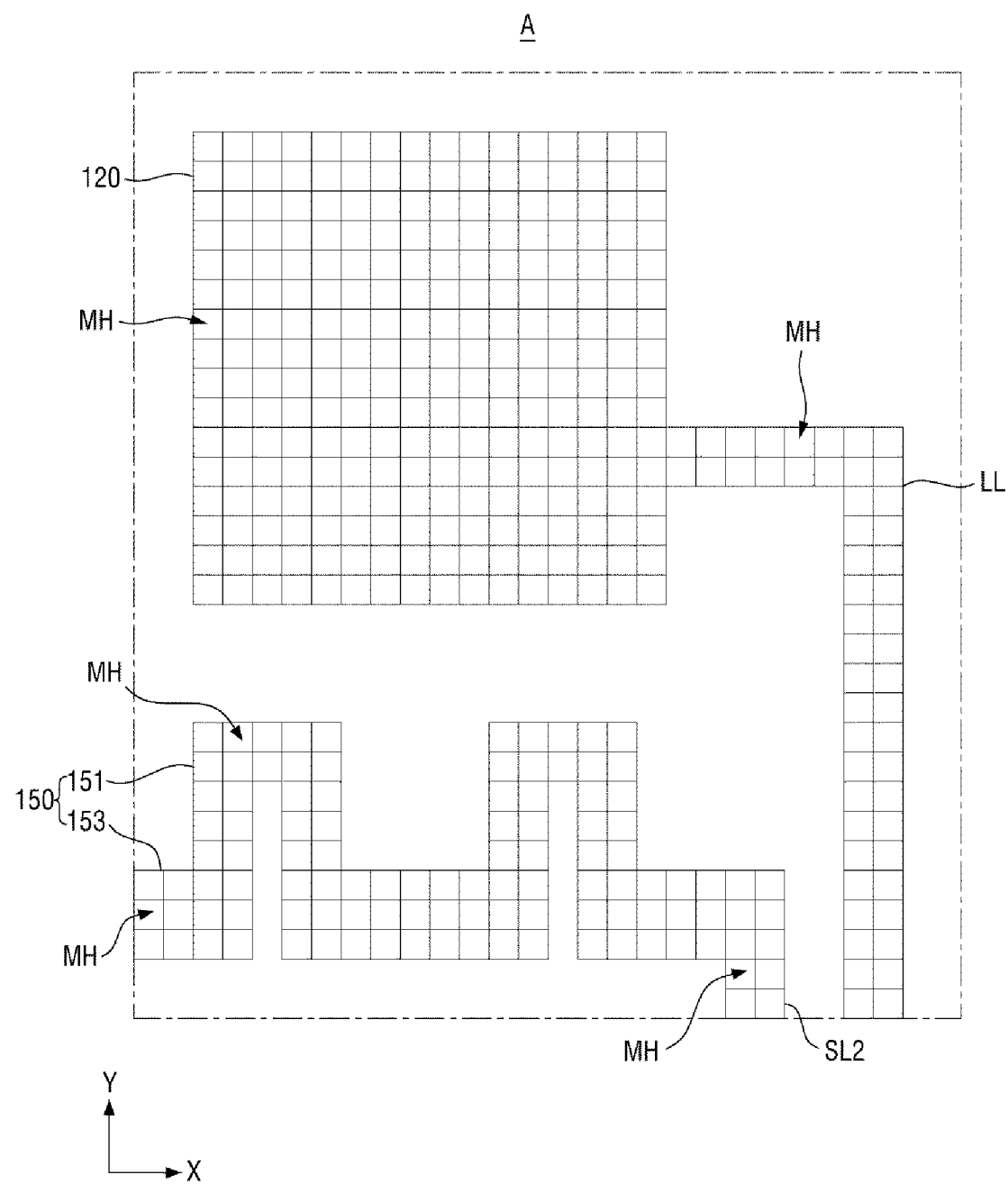
FIG. 6 is an enlarged plan view showing portion A of FIG. 4 according to an exemplary embodiment.
Figure 7:
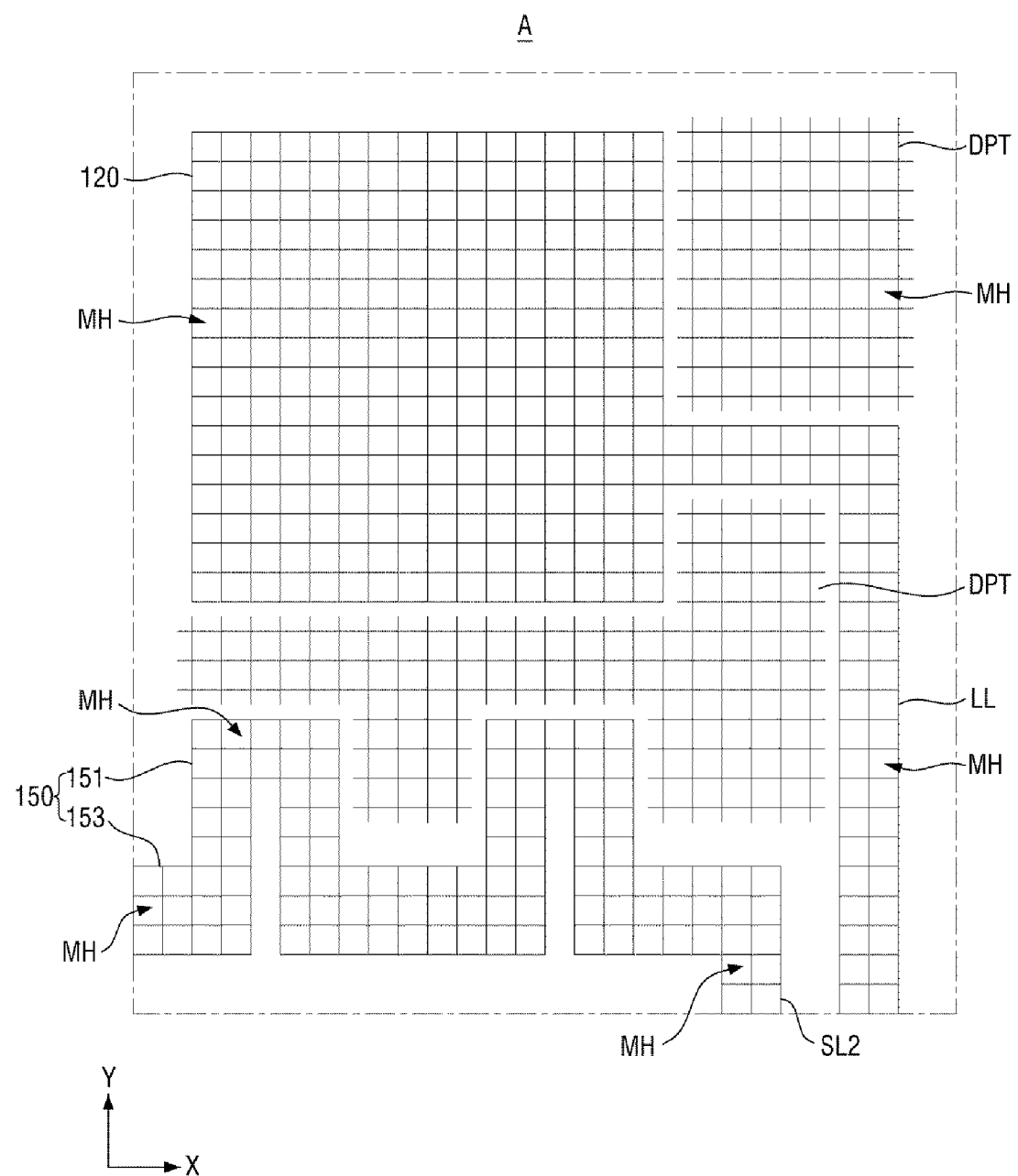
FIG. 7 is an enlarged plan view showing portion A of FIG. 4 according to another exemplary embodiment.
Figure 8:
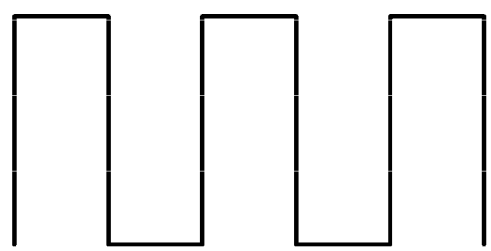
FIG. 8 is a plan view showing a resistance line according to another exemplary embodiment.
Figure 8:
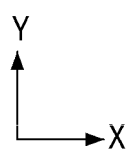
Figure 9:
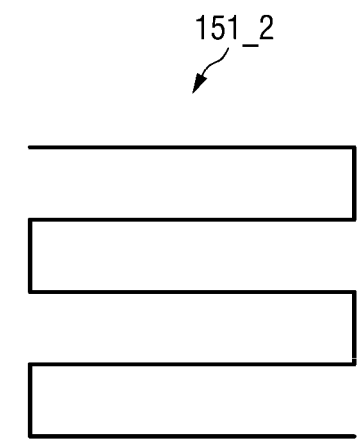
FIG. 9 is a plan view showing a resistance line according to another exemplary embodiment.
Figure 9:
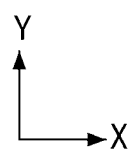
Figure 10:
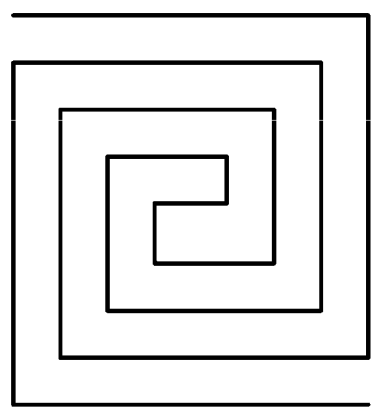
FIG. 10 is a plan view showing a resistance line according to still another exemplary embodiment.
Figure 10:
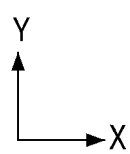
Figure 11:
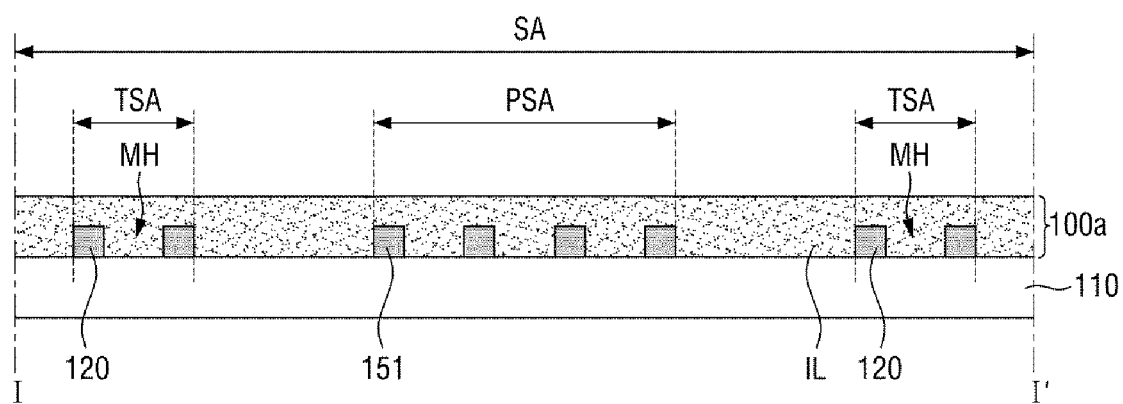
FIG. 11 is a cross-sectional view taken along a sectional line I-I' of FIG. 4.

FIG. 4 is a plan view of a touch sensor according to an exemplary embodiment. FIG. 5 is a plan view of a touch sensor according to another exemplary embodiment. FIG. 6 is an enlarged plan view showing portion A of FIG. 4 according to an exemplary embodiment. FIG. 7 is an enlarged plan view showing portion A of FIG. 4 according to another exemplary embodiment. FIG. 8 is a plan view showing a resistance line according to another exemplary embodiment. FIG. 9 is a plan view showing a resistance line according to another exemplary embodiment. FIG. 10 is a plan view showing a resistance line according to still another exemplary embodiment. FIG. 11 is a cross-sectional view taken along a sectional line I-I' of FIG. 4.

Referring to FIGS. 4, 5, 6, 7, 8, 9, 10, and 11, the touch sensor TSM includes a sensor portion 100 and a controller 200. Since the controller 200 has been described in detail with reference to FIG. 3, a redundant description will be omitted.

The sensor portion 100 includes a base layer 110 and a sensing pattern 100a disposed on the base layer 110. The sensing pattern 100a includes electrode members 120 and strain gauges 150.

The base layer 110 may include a sensing area SA and a peripheral area NSA. The base layer 110 is a layer serving as a base of the sensing pattern 100a. In some exemplary embodiments, the base layer 110 may be one of the layers constituting the display panel 300. For example, in an exemplary embodiment in which the sensor portion 100 and the display panel 300 are integrally formed, the base layer 110 may be at least one layer constituting the display panel 300. For example, the base layer 110 may be a thin film encapsulation (TFE) layer of the display panel 300. Alternatively, the base layer 110 may be a rigid substrate or a flexible substrate depending on the exemplary embodiment. For example, the base layer 110 may be a rigid substrate made of glass or tempered glass, or a flexible substrate formed of a thin film of a flexible plastic material. Hereinafter, a case where the base layer 110 includes at least one layer constituting the display panel 300, for example, a layer including a thin film encapsulation layer, will be described as an example.

On the sensing area SA of the base layer 110, there may be disposed the electrode members 120 arranged in an island shape, the strain gauges 150 arranged between the electrode members 120, wiring lines LL electrically connected to the electrode members 120, and a first signal line SL1 and a second signal line SL2 connected to the strain gauges 150.

The electrode members 120 may be arranged in an island shape along the rows and the columns as described above. Although FIG. 4 illustrates that four electrode members 120 are arranged along the second direction (Y-axis direction), three electrode members 120 are arranged along the first direction (X-axis direction), a first electrode row RD1, a second electrode row RD2, a third electrode row RD3, and a fourth electrode row RD4 are sequentially arranged along the second direction (Y-axis direction), and a first electrode column CD1, a second electrode column CD2, and a third electrode column CD3 are sequentially arranged along the first direction (X-axis direction), this is merely for convenience of description and the present disclosure is not limited thereto. The number and arrangement of the electrode members 120 may be changed variously.

The electrode members 120 may be disposed on the base layer 110 and may include a conductive material. For example, the conductive material may include a metal or an alloy thereof. The metal may be at least one selected from the group consisting of gold (Au), silver (Ag), aluminum (Al), molybdenum (Mo), chromium (Cr), titanium (Ti), nickel (Ni), neodymium (Nd), copper (Cu), platinum (Pt) and the like. Also, the electrode members 120 may be made of a transparent conductive material. Examples of the transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene and the like.

The electrode members 120 may have a single-layer structure or a multilayer structure. When the electrode members 120 are formed to have a multilayer structure, the electrode members 120 may include multiple metal layers. For example, the electrode members 120 may have a three-layer structure of titanium/aluminum/titanium.

Further, the electrode members 120 may have a mesh structure for transmitting light outputted from the display area DA of the display panel 300. For example, the electrode members 120 may include a plurality of mesh holes MH, and a portion of the base layer 110 is exposed by the mesh holes MH. The mesh holes MH of the electrode members 120 may overlap a light emitting region of the display panel 300 in the third direction (Z-axis direction) which is the thickness direction. Further, the area of the mesh holes MH may be larger than the area of the light emitting region of the display panel 300. Thus, even if the electrode members 120 are located on the display area DA of the display panel 300, since the mesh holes MH are disposed in the electrode members 120, light outputted from the display area DA can be smoothly outputted to the outside after passing through the electrode members 120.

The strain gauges 150 may be disposed on the sensing area SA of the base layer 110 and may be disposed on the same layer as the electrode members 120. In addition, the strain gauges 150 and the electrode members 120 may not overlap each other in the third direction (Z-axis direction). However, the present disclosure is not limited thereto. In some exemplary embodiments, the strain gauges 150 and the electrode members 120 may partially overlap each other in the third direction (Z-axis direction).

The strain gauge 150 may include a resistance line 151 and a connection line 153.

The resistance line 151 may be disposed between the electrode members 120 in the second direction (Y-axis direction), and may be spaced apart from the electrode members 120.

The resistance line 151 may be bent to have a predetermined pattern. For example, when a pressure having a predetermined magnitude is applied to the sensor portion 100 of the touch sensor TSM, the length or cross-sectional area of the resistance line 151 is deformed, and the resistance value changes according to the deformation of the length or the cross-sectional area of the resistance line 151. Thus, the magnitude of the touch pressure may be determined based on the changed resistance value.

The resistance line 151 may be shaped to include two or more bent portions and portions extending in the first direction (X-axis direction) and a direction opposite to the first direction (X-axis direction). However, the present disclosure is not limited thereto, and the resistance line 151 may have various shapes. For example, as shown in FIG. 8, a resistance line 151_1 may be shaped to include two or more bent portions and portions which extend in the second direction (Y-axis direction). As shown in FIG. 9, a resistance line 151_2 may be shaped to include two or more bent portions and portions which extend in the first direction (X-axis direction). As shown in FIG. 10, a first resistance line 151_3 may be formed to be wound in an angular spiral shape. Unlike the example illustrated in FIG. 10, the first resistance line 151_3 may be formed to be wound in a curved spiral shape. However, the present disclosure is not limited thereto, and the shape of the resistance line 151 may be changed variously depending on the position and the number.

The resistance line 151 may be disposed on the same layer as the electrode members 120 and the resistance line 151 may be formed of the same material as the electrode members 120. For example, the resistance line 151 may include a conductive material. The resistance line 151 and the electrode members 120 may be formed in the same process and the resistance line 151 may be formed in a mesh structure similarly to the electrode members 120. For example, the resistance line 151 may include a plurality of mesh holes MH, and a portion of the base layer 110 may be exposed by the mesh holes MH of the resistance line 151. The mesh holes MH of the resistance line 151 may overlap the light emitting region of the display panel 300 in the third direction (Z-axis direction) which is the thickness direction. Further, the area of the mesh holes MR of the resistance line 151 may be larger than the area of the light emitting region of the display panel 300. Thus, even if the resistance line 151 is located on the display area DA of the display panel 300, light outputted from the display area DA of the display panel 300 can be smoothly outputted to the outside after passing through the resistance line 151.

In some exemplary embodiments, the resistance line 151 may be formed by removing a portion of the mesh structure. For example, in the case where the resistance line 151 is formed by removing a portion of the mesh structure, a plurality of branch portions separated from each other may be formed. The branch portions may be residues which remain by removing a partial region of the mesh structure. Further, in some exemplary embodiments, as shown in FIG. 7, a dummy pattern DPT may be disposed in an area where the connection line 153, the resistance line 151 and the electrode members 120 are not disposed. The dummy pattern DPT may be disposed on the same layer as the connection line 153, the resistance line 151 and the electrode members 120, and may be disposed to be spaced apart from the connection line 153, the resistance line 151 and the electrode members 120. The dummy pattern DPT can prevent or reduce the deterioration of image quality due to visibility of an area where the connection line 153, the resistance line 151 and the electrode members 120 are not disposed in the display area DA.

The connection line 153 may electrically connect the resistance lines 151 disposed along the second direction (Y-axis direction) to each other. Although FIG. 4 illustrates that the connection line 153 electrically connects the three resistance lines 151 disposed along the second direction (Y-axis direction), this is merely exemplary, but the present disclosure is not limited thereto. In some exemplary embodiments, the connection line 153 may electrically connect only two neighboring resistance lines 151 along the second direction (Y-axis direction). In some exemplary embodiments, the connection line 153 may electrically connect the resistance lines 151 arranged along the first direction (X-axis direction) to each other. Further, although it is illustrated in the drawing that one connection line 153 is disposed to electrically connect the resistance lines 151 arranged along the second direction (Y-axis direction), but the present disclosure is not limited thereto, and two or more connection lines 153 may be disposed. When a plurality of connection lines 153 are disposed, there is an advantage that connection reliability between the resistance lines 151 can be improved.

The connection lines 153 may be in direct contact with the resistance lines 151 and the connection lines 153 may be separated without contacting the electrode members 120.

The connection line 153 may be disposed on the same layer as the resistance line 151 and the electrode members 120, and the connection line 153 may be formed of the same material as the resistance line 151 and the electrode members 120. For example, the connection line 153 may include a conductive material. Further, the connection line 153 may be formed in the same process as the resistance line 151 and the electrode members 120. The connection line may have a mesh structure similarly to the resistance line 151 and the electrode members 120.

An insulating layer IL may be disposed on the electrode members 120, the connection line 153 and the resistance line 151. For example, the insulating layer IL may cover the electrode members 120, the connection line 153, and the resistance line 151. That is, the insulating layer IL may be in contact with the electrode members 120, the connection line 153, the resistance line 151 and the base layer 110, and the mesh holes MH disposed in each of the electrode members 120, the connection line 153, and the resistance line 151 may be filled with an insulating material forming the insulating layer IL. The electrode members 120 and the strain gauges 150 disposed on the same layer may be electrically isolated from each other by the insulating layer IL.

The insulating layer IL may include an insulating material. In some exemplary embodiments, the insulating material may be an inorganic insulating material or an organic insulating material. The inorganic insulating material may include at least one of aluminum oxide, titanium oxide, silicon oxide, silicon oxynitride, zirconium oxide, and hafnium oxide. The organic insulating material may include at least one selected from the group consisting of an acrylic resin, a methacrylic resin, polyisoprene, a vinyl resin, an epoxy resin, a urethane resin, a cellulose resin, a siloxane resin, a polyimide resin, a polyamide resin and a perylene resin.

The sensor portion 100 may include wiring lines LL and signal lines SL1 and SL2. For example, the sensor portion 100 may include a first signal line SL1 and a second signal line SL2 connected to the resistance lines 151 and the wiring lines LL connected to the electrode members 120, respectively.

One distal end of the wiring lines LL may be connected to each of the electrode members 120, and the number of the wiring lines LL may be equal to the number of the electrode members 120. For example, when n electrode members 120 are arranged in the first direction (X-axis direction), n wiring lines LL may be disposed corresponding to n electrode members 120. When m first electrode rows RD1, each having n electrode members 120 arranged in the first direction (X-axis direction), are arranged in the second direction (Y-axis direction), n×m wiring lines LL may be disposed. The other distal end of the n×m wiring lines LL may be connected to a pad portion TP. However, the present disclosure is not limited thereto, and in some exemplary embodiments, when a plurality of electrode members 120 form an electrode group, one wiring line LL may be connected to one electrode group. In this case, the number of wiring lines LL may be smaller than the number of the electrode members 120.

One distal end of the first signal line SL1 may be connected to one distal end of the strain gauge 150 and one distal end of the second signal line SL2 may be connected to the other distal end of the strain gauge 150. More specifically, as shown in FIG. 4, when one distal ends of the three resistance lines 151 arranged along the second direction (Y-axis direction) are electrically connected to each other by the connection line 153 of the strain gauge 150, the first signal line SL1 may be connected to the other distal end of the first resistance line 151 disposed in the second direction (Y axis direction), and the second signal line SL2 may be connected to the other distal end of the third resistance line 151. The other distal ends of the first signal line SL1 and the second signal line SL2 may be connected to the pad portion TP.

The wiring lines LL and the first and second signal lines SL1 and SL2 may be arranged in the same layer as the electrode members 120, the connection line 153, and the resistance line 151. The wiring lines LL and the first and second signal lines SL1 and SL2 may be made of the same material as the electrode members 120, the connection line 153, and the resistance line 151. For example, the wiring lines LL and the first and second signal lines SL1 and SL2 may include a conductive material. The wiring lines LL and the first and second signal lines SL1 and SL2 may be formed in the same process as the electrode members 120, the connection line 153, and the resistance line 151, and may have a mesh structure.

The pad portion TP includes a plurality of pads arranged along the first direction x, and the wiring lines LL and the first and second signal lines SL1 and SL2 may be connected to the respective pads. Further, as shown in FIG. 4, the pad portion TP may include a signal line connection pattern CNL that electrically connects the adjacent strain gauges 150 to each other. For example, the signal line connection pattern CNL may electrically connect the second signal line SL2 of the strain gauge 150 disposed on the first electrode column CD1 and the first signal line SL1 of the strain gauge 150 disposed on the second electrode column CD2, and may electrically connect the second signal line SL2 of the strain gauge 150 disposed on the second electrode column CD2 and the first signal line SL1 of the strain gauge 150 disposed on the third electrode column CD3. In this case, the strain gauge 150 disposed on the first electrode column CD1, the strain gauge 150 disposed on the second electrode column CD2, and the strain gauge 150 disposed on the third electrode column CD3 may sense a pressure with one sensor. However, the present disclosure is not limited thereto. As shown in FIG. 5, a pad portion TP of a sensor portion 100_1 may not include a signal line connection pattern CNL for electrically connecting the adjacent strain gauges 150 to each other. In this case, the strain gauge 150 disposed on the first electrode column CD1, the strain gauge 150 disposed on the second electrode column CD2, and the strain gauge 150 disposed on the third electrode column CD3 may sense a pressure with a first pressure sensor GR1, a second pressure sensor GR2, and a third pressure sensor GR3, respectively. As described above, the strain gauges 150 can be grouped through the signal line connection pattern CNL, and the arrangement of the signal line connection pattern CNL can be modified variously.

In the touch sensor TSM according to the above-described exemplary embodiment, since all of the electrode members 120, the strain gauge 150, the wiring lines LL and the first and second signal lines SL1 and SL2 are disposed in the same layer in the sensing area SA, there is an advantage that the electrode members 120, the strain gauge 150, the wiring lines LL and the first and second signal lines SL1 and SL2 can be simultaneously formed through a single mask process. Thus, by simplifying a manufacturing process of the display device 1, the productivity can be effectively improved, and the touch sensor TSM can be realized in a thin shape.

Meanwhile, according to the above-described exemplary embodiments, the base layer 110 serving as a base of the sensor portion 100 may be a thin film encapsulation (TFE) layer of the organic light emitting diode display panel. In this case, the base layer 110 may be embodied as a multilayer including at least one organic film and at least one inorganic film, or may be embodied as a single layer including a combination of organic and inorganic materials. For example, the base layer 110 may be a multilayer including at least two inorganic films and at least one organic film interposed between the inorganic films. In a display device in which the base layer 110 is implemented as a thin film encapsulation layer of the organic light emitting diode display panel, the components of the display panel 300 may be disposed on one surface of the base layer 110 and the electrodes constituting the sensor portion 100 may be disposed on the other surface of the base layer 110.

Figure 12:
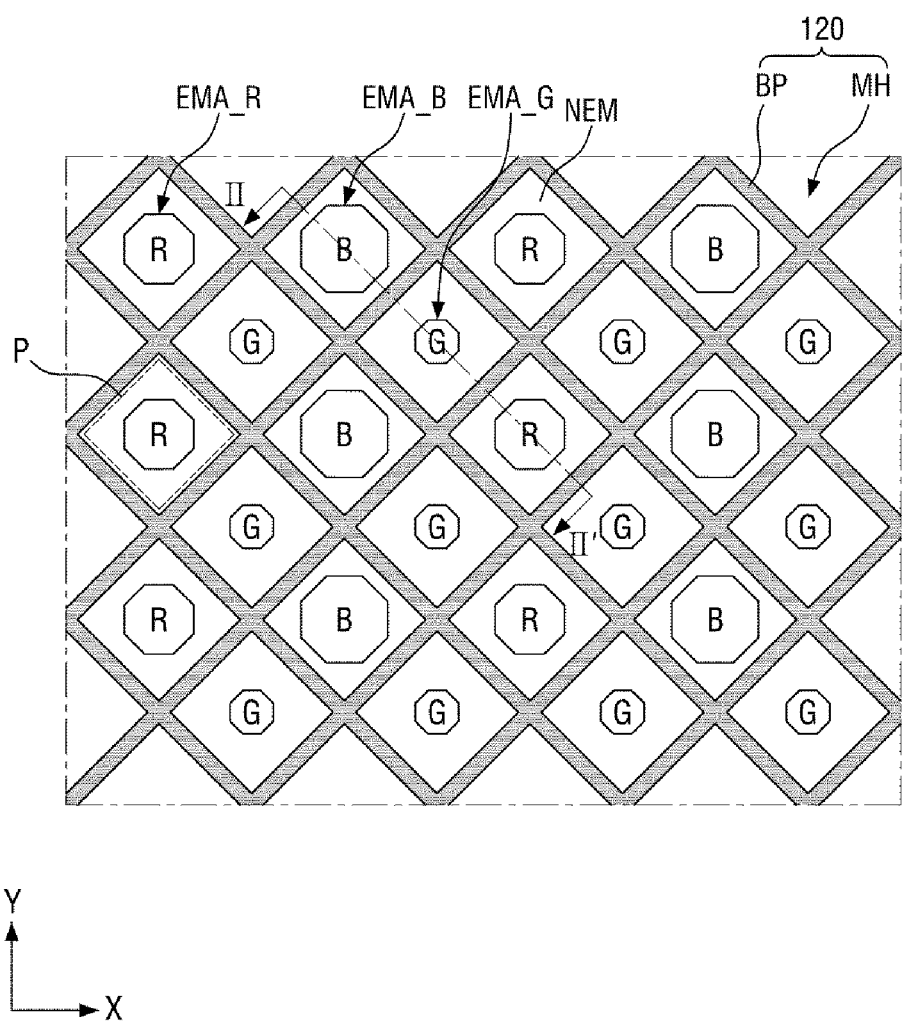
FIG. 12 is a schematic view showing an arrangement relationship between pixels and a sensor portion of a display panel according to an exemplary embodiment.
Figure 13:
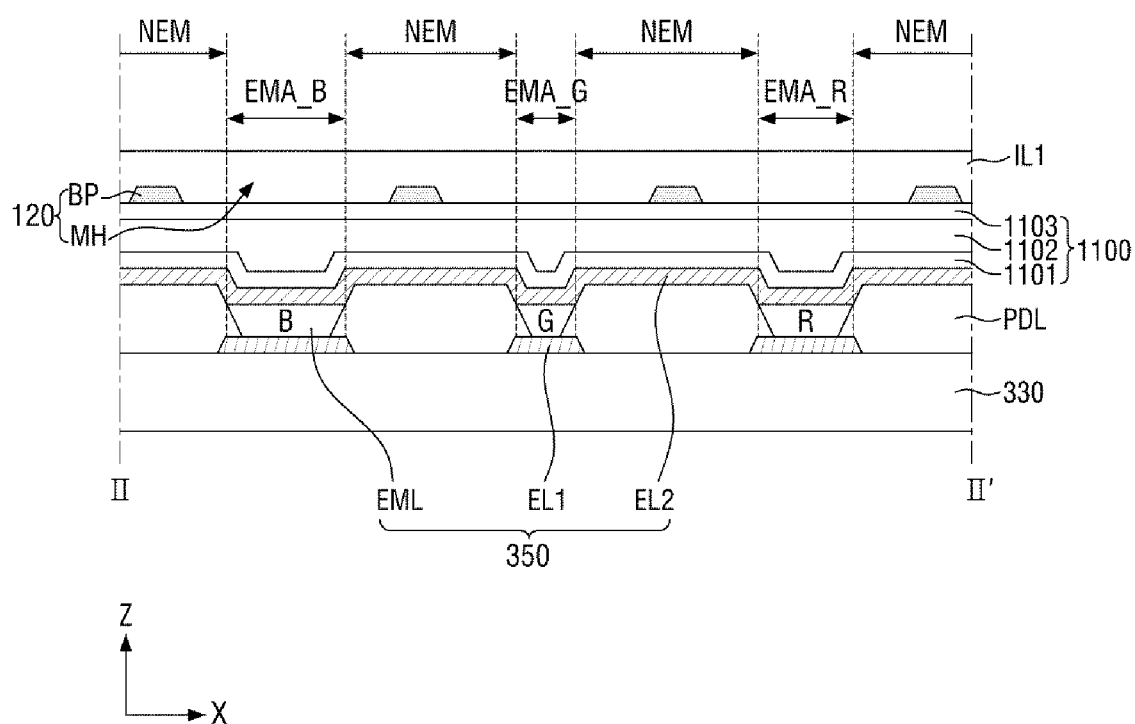
FIG. 13 is a cross-sectional view taken along a sectional line II-II' of FIG. 12.

FIG. 12 is a schematic view showing an arrangement relationship between pixels and a sensor portion of a display panel according to an exemplary embodiment. FIG. 13 is a cross-sectional view taken along a sectional line II-IP of FIG. 12.

FIG. 12 exemplarily shows a region where the insulating layer IL and the electrode members 120 of FIG. 4 overlap each other in a plan view. The strain gauge 150, the wiring lines LL and the first and second signal lines SL1 and SL2 forming the mesh structure may also have the same arrangement relationship with the pixels of the display panel 300.

Referring to FIG. 12, the display panel 300 includes a plurality of pixels P. Each pixel P may include a light emitting region EMA and a non-light emitting region NEM.

The pixel P may include a first color pixel, a second color pixel and a third color pixel. Each color pixel P may be arranged in various ways. In one exemplary embodiment, a first color pixel (e.g., a red pixel) and a second color pixel (e.g., a blue pixel) are alternately arranged to form a first row along the first direction (X-axis direction), and a third color pixel (e.g., a green pixel) may be arranged in a second row adjacent to the first row along the first direction (X-axis direction). The pixels belonging to the second row may be arranged alternately in the first direction (X-axis direction) with respect to the pixels belonging to the first row. The number of the third color pixels belonging to the second row may be twice the number of the first color pixels or the second color pixels belonging to the first row. The arrangement of the first row and the second row may be repeated along the first direction (X-axis direction).

The size of the light emitting region EMA in each color pixel P may be different. For example, a light emitting region EMA_B of the second color pixel may be larger than a light emitting region EMA_R of the first color pixel, and a light emitting region EMA_G of the third color pixel may be smaller than a light emitting region EMA_R of the first color pixel.

The shape of the light emitting region EMA of each color pixel P may be substantially octagonal. However, the present disclosure is not limited thereto, and the shape of each light emitting region EMA may be a circular shape, other polygonal shapes such as a rhombus shape, a rounded polygonal shape, or the like.

As described above, the electrode members 120 may be divided into mesh holes MH and a body part BP. The mesh holes MH may overlap the light emitting region EMA in the thickness direction, and the area of the mesh holes MH may be larger than the area of the light emitting region EMA. The body part BP may overlap the non-light emitting region NEM in the thickness direction, and the width of the body part BP may be smaller than the width of the non-light emitting region NEM. With this structure, light outputted from the light emitting region EMA of the display panel 300 can be effectively transmitted through the electrode members 120.

Referring to FIG. 13, a first electrode EL1 is disposed for each pixel on the base substrate 330. A pixel defining layer PDL that exposes the first electrode EL1 may be disposed on the first electrode EL1. The pixel defining layer PDL is disposed in the non-light emitting region NEM.

A light emitting layer EML may be disposed on the first electrode EL1 exposed by the pixel defining layer PDL, and a second electrode EL2 may be disposed thereon. The second electrode EL2 may be disposed over the entire surface irrespective of pixels. The first electrode EL1, the light emitting layer EML and the second electrode EL2 constitute the light emitting element 350, respectively.

A thin film encapsulation layer 1100 including a first inorganic film 1101, an organic film 1102, and a second inorganic film 1103 may be disposed on the second electrode EL2, and the electrode members 120 and the insulating layer IL may be arranged sequentially thereon.

The body part BP may be disposed to overlap the pixel defining layer PDL, and may be located in the non-light emitting region NEM. That is, since the body part BP does not overlap the light emitting region EMA, it may not interfere with the light emission.

Figure 14:
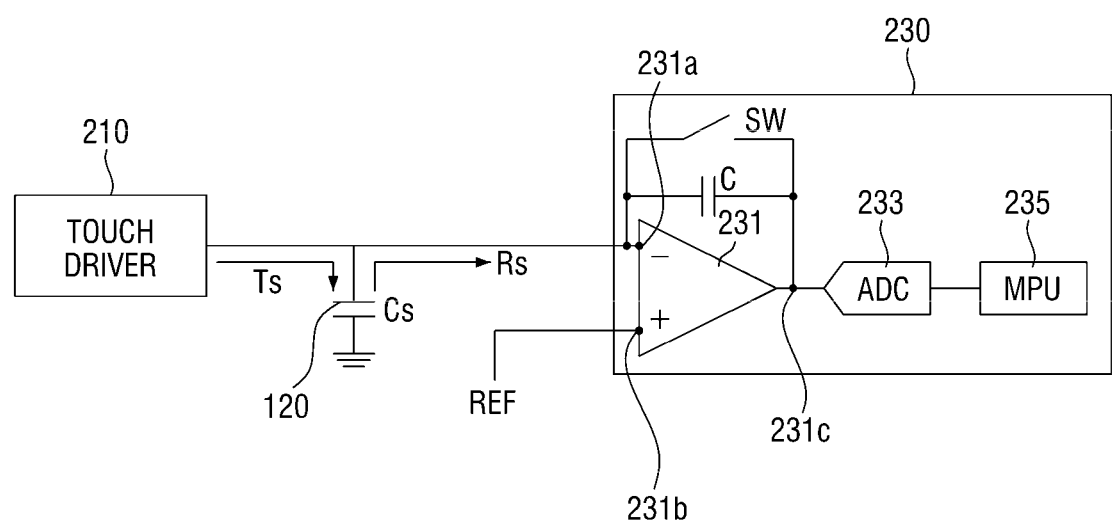
FIG. 14 is a diagram explaining a touch position detecting operation of a touch sensor according to an exemplary embodiment.

FIG. 14 is a diagram explaining a touch position detecting operation of a touch sensor according to an exemplary embodiment.

Referring to FIGS. 4 and 14, the touch driver 210 may provide the driving signal Ts to the electrode members 120 with a capacitance Cs through the wiring lines LL, and the touch detector 230 may receive the sensing signal Rs from electrode members 130 through the wiring lines LL. The sensing signal Rs may include information on the amount of change in self-capacitance formed in the electrode members 120, as described above.

The touch detector 230 may include at least one first amplification circuit 231 such as an operational amplifier, an analog-to-digital converter (ADC) 233, and a processor (MPU) 235.

The first amplification circuit 231 may include a first input terminal 231a, a second input terminal 231b and an output terminal 231c. According to the exemplary embodiment, the first input terminal 231a of the first amplification circuit 231, e.g., an inverting input terminal of the operational amplifier, may be electrically connected to the electrode members 130 via the wiring line LL or the like. The sensing signal Rs may be inputted to the first input terminal 231a.

The second input terminal 231b of the first amplification circuit 231, e.g., a non-inverting input terminal of the operational amplifier, is a reference potential terminal, and may be connected to a reference power source REF as an example. In some exemplary embodiments, the reference power source may be a ground (GND) power source. However, the present disclosure is not limited thereto. When the sensor portion 100 includes a noise sensing electrode member, the second input terminal 231b may be electrically connected to the noise sensing electrode member.

In the case of including the noise sensing electrode member, the touch sensor TSM can effectively cancel a noise signal inputted from the display panel 300 and the like, and improve a signal-to-noise ratio (SNR). Accordingly, it is possible to minimize the malfunction of the touch sensor TSM according to the noise signal and improve the sensing sensitivity.

In some exemplary embodiments, a capacitor C and a reset switch SW may be connected in parallel between the first input terminal 231a and the output terminal 231c of the first amplification circuit 231.

Meanwhile, although it has been described in the above exemplary embodiment that the first amplification circuit 231 is implemented as an inverting amplification circuit, the present disclosure is not limited thereto. In other exemplary embodiments, the first amplification circuit 231 may be implemented in the form of a non-inverting amplification circuit or the like.

The output terminal 231c of the first amplification circuit 231 may be electrically connected to the analog-to-digital converter 233.

The analog-to-digital converter 233 may convert an input analog signal into a digital signal. According to the exemplary embodiment, the analog-to-digital converter 233 may be provided as many as the number of the electrode members 120 in one-to-one correspondence. Alternatively, in another exemplary embodiment, the electrode members 120 may be configured to share one analog-to-digital converter 233, and in this case, a switching circuit for channel selection may be additionally provided.

The processor 235 processes the converted signal (digital signal) from the analog-to-digital converter 233, and detects the touch input according to the signal processing result. For example, the processor 235 may comprehensively analyze the sensing signal amplified by the first amplification circuit 231 and converted by the analog-to-digital converter 233 to detect whether or not a touch input has occurred and its position. According to an exemplary embodiment, the processor 235 may be implemented as a microprocessor (MPU). In this case, a memory required for driving the processor 235 may be additionally provided in the touch detector 230. Meanwhile, the configuration of the processor 235 is not limited thereto. As another example, the processor 235 may be implemented as a microcontroller (MCU) or the like.

Figure 15:
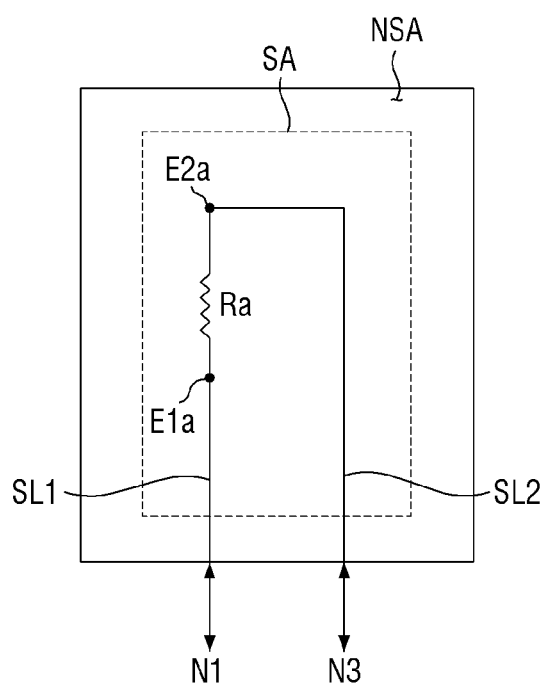
FIG. 15 is a diagram schematically showing an arrangement of signal lines and a strain gauge of a touch sensor and a connection relationship with a Wheatstone bridge circuit portion according to an exemplary embodiment.
Figure 16:
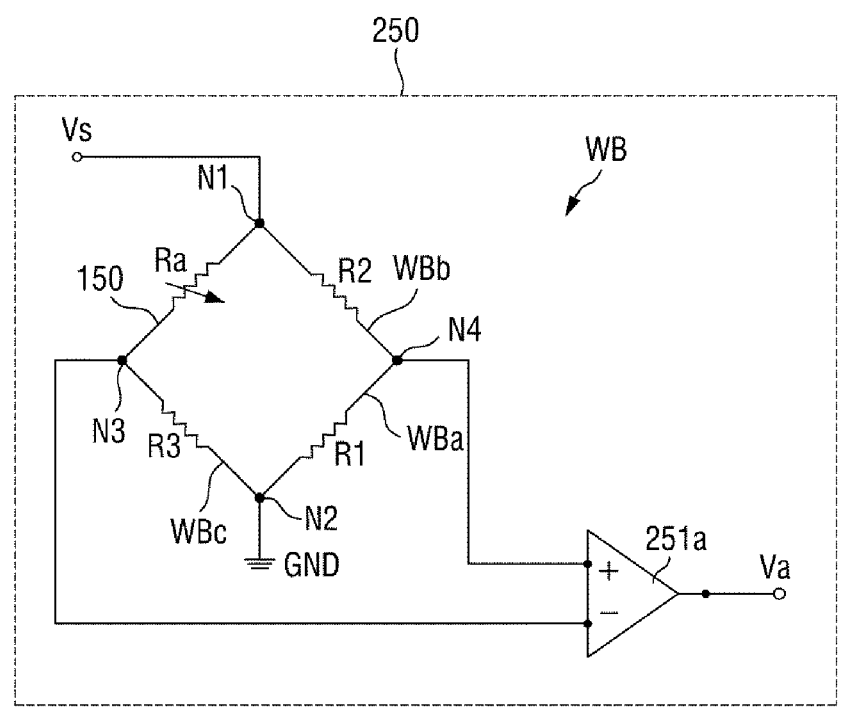
FIG. 16 is a diagram schematically showing a first pressure detector including a first Wheatstone bridge circuit portion electrically connected to a first strain gauge of a touch sensor according to an exemplary embodiment.

FIG. 15 is a diagram schematically showing an arrangement of signal lines and a strain gauge of a touch sensor and a connection relationship with a Wheatstone bridge circuit portion according to an exemplary embodiment. FIG. 16 is a diagram schematically showing a first pressure detector including a first Wheatstone bridge circuit portion electrically connected to a first strain gauge of a touch sensor according to an exemplary embodiment.

Referring to FIGS. 15 and 16, the first strain gauge 150 may include one distal end E1a and the other distal end E2a separated from each other by a predetermined distance along the second direction (Y-axis direction). As described above, one distal end E1a of the first strain gauge 150 may be connected to the first signal line SL1 and the other distal end E2a of the first strain gauge 150 may be connected to the second signal line SL2.

Although one strain gauge 150 is illustrated as an example for convenience of explanation, a plurality of strain gauges 150 may be disposed on the sensing area SA as described above. That is, the Wheatstone bridge circuit portion WB electrically connected to the strain gauge 150 may also be provided on the controller 200 in a number corresponding to the number of the strain gauges 150 arranged for individual connection.

The pressure detector 250 may include the Wheatstone bridge circuit portion WB. The pressure detector 250 may further include an analog-to-digital converter and a processor for detecting a first voltage Va outputted from the Wheatstone bridge circuit portion WB.

The Wheatstone bridge circuit portion WB includes a first node N1, a second node N2, a first output node N3, and a second output node N4. A driving voltage Vs may be provided to the first node N1, and the second node N2 may be connected to the ground GND.

The Wheatstone bridge circuit portion WB may further include a first resistor WBa connected to the second node N2 and the second output node N4, a second resistor WBb connected to the first node N1 and the second output node N4, and a third resistor WBc connected to the second node N2 and the first output node N3.

A resistance value R1 of the first resistor WBa, a resistance value R2 of the second resistor WBb, and a resistance value R3 of the third resistor WBc may have predetermined values, respectively. That is, the first to third resistors WBa, WBb, and WBc may be fixed resistors.

The Wheatstone bridge circuit portion WB may further include a second amplification circuit 251a such as an operational amplifier. The second amplification circuit 251a may include an inverting input terminal, a non-inverting input terminal and an output terminal. Through the second amplification circuit 251a, it is possible to sense an electrical flow between the first output node N3 and the second output node N4. In other words, the second amplification circuit 251a may operate as a galvanometer element or a voltage measuring element.

One of the first output node N3 and the second output node N4 may be electrically connected to one of the input terminals of the second amplification circuit 251a and the other one may be electrically connected to another input terminal of the second amplification circuit 251a. For example, the first output node N3 may be connected to the inverting input terminal of the second amplification circuit 251a, and the second output node N4 may be connected to the non-inverting input terminal of the second amplification circuit 251a.

The output terminal of the second amplification circuit 251a may output a first voltage Va proportional to a difference between the voltage values inputted to the both input terminals.

One distal end E1a of the strain gauge 150 may be electrically connected to the first node N1 via the first signal line SL1, and the other distal end E2a of the strain gauge 150 may be connected to the first output node N3 via the second signal line SL2.

In the present exemplary embodiment, the strain gauge 150, the first resistor WBa, the second resistor WBb and the third resistor WBc may be connected to each other to implement the Wheatstone bridge circuit portion WB.

In a state where the touch input is not applied, the product of the resistance value Ra of the strain gauge 150 and the resistance value R1 of the first resistor WBa may be substantially equal to the product of the resistance value R2 of the second resistor WBb and the resistance value R3 of the third resistor WBc.

As described above, when the product of the resistance value Ra of the strain gauge 150 and the resistance value R1 of the first resistor WBa is equal to the product of the resistance value R2 of the second resistor WBb and the resistance value R3 of the third resistor WBc, the voltage of the first output node N3 and the voltage of the second output node N4 may be equal to each other. When the voltages of the first output node N3 and the second output node N4 are equal to each other, the voltage difference between the first output node N3 and the second output node N4 is 0 V, and the first voltage Va outputted by the second amplification circuit 251a may be 0 V.

When the touch input is applied to the sensor portion 100, the shape of the strain gauge 150 may be deformed according to the intensity of the touch, and the resistance value Ra of the strain gauge 150 may be changed by the shape deformation. Accordingly, a voltage difference is generated between the first output node N3 and the second output node N4. When a voltage difference is generated between the first output node N3 and the second output node N4, the second amplification circuit 251a outputs a value other than 0 V as the first voltage Va, and the touch sensor can measure the intensity of the touch or the pressure of the touch by measuring it.

Figure 17:
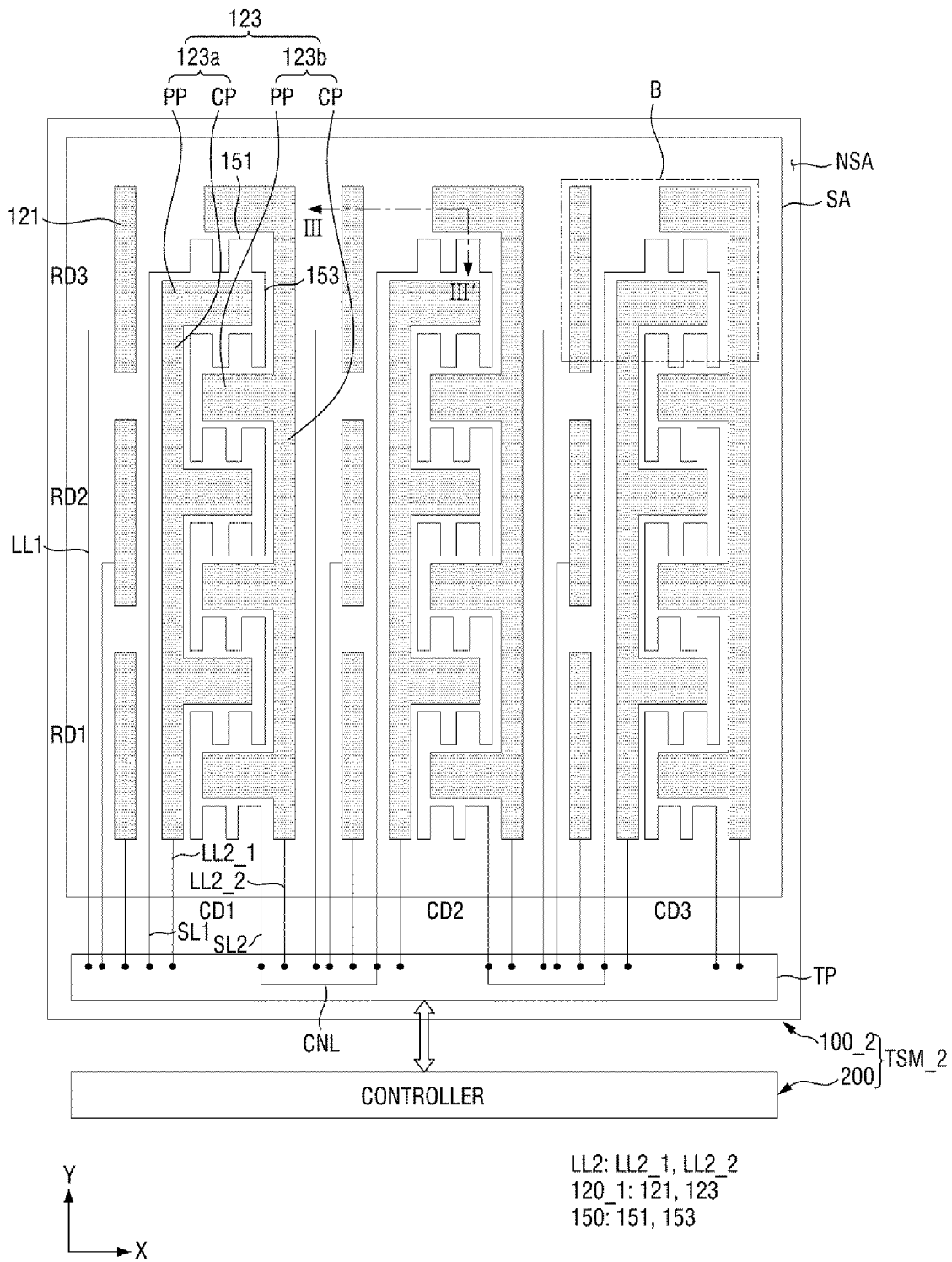
FIG. 17 is a plan view of a touch sensor according to another exemplary embodiment.
Figure 18:
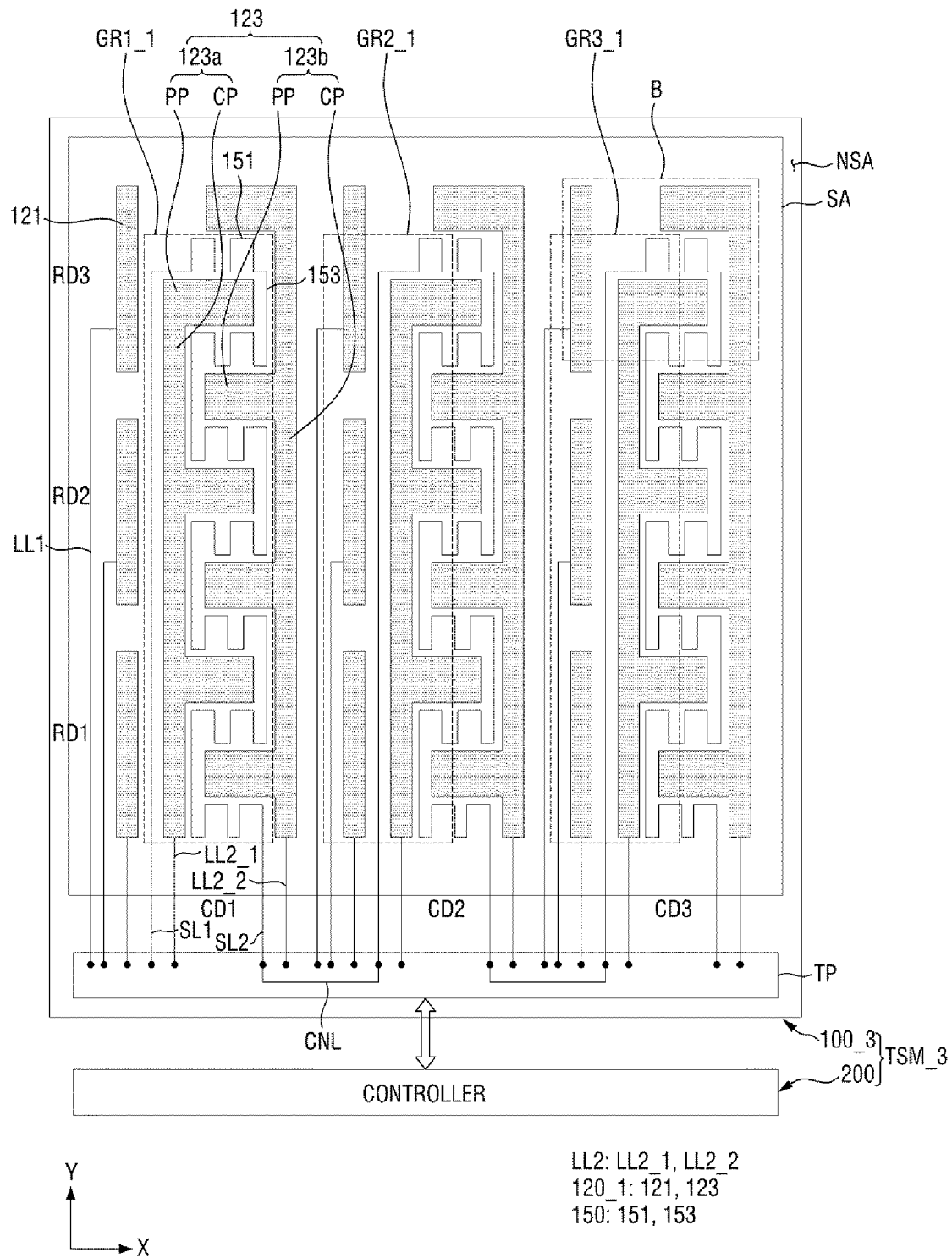
FIG. 18 is a plan view of a touch sensor according to another exemplary embodiment.
Figure 19:
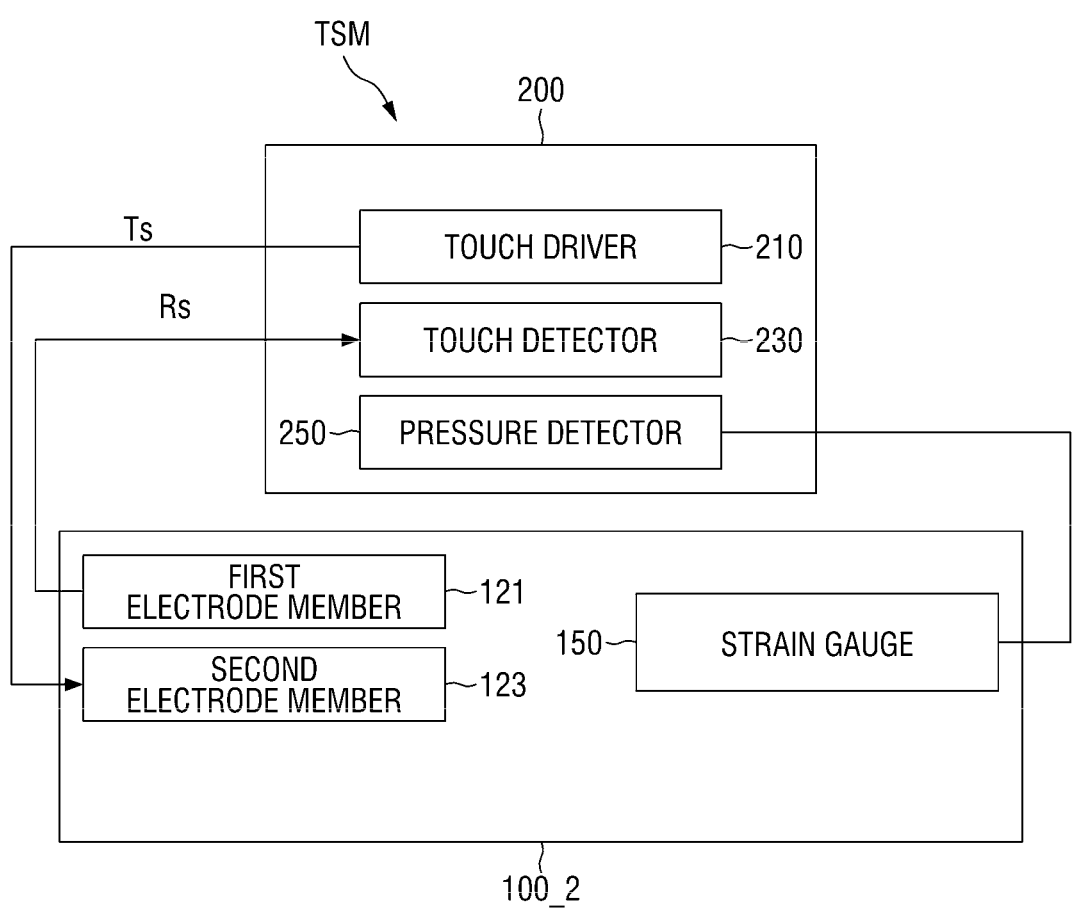
FIG. 19 is a block diagram of the touch sensor shown in FIG. 17.
Figure 20:
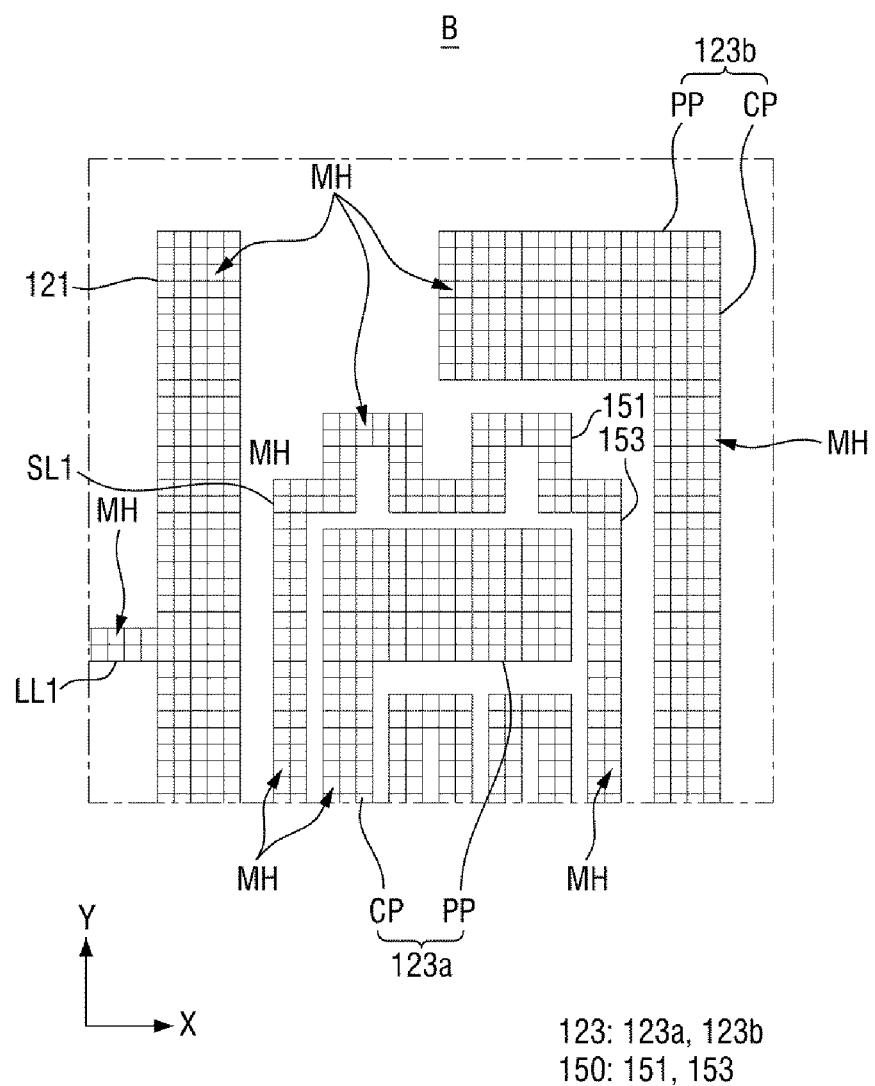
FIG. 20 is an enlarged plan view of portion B of FIG. 17 according to an exemplary embodiment.
Figure 21:
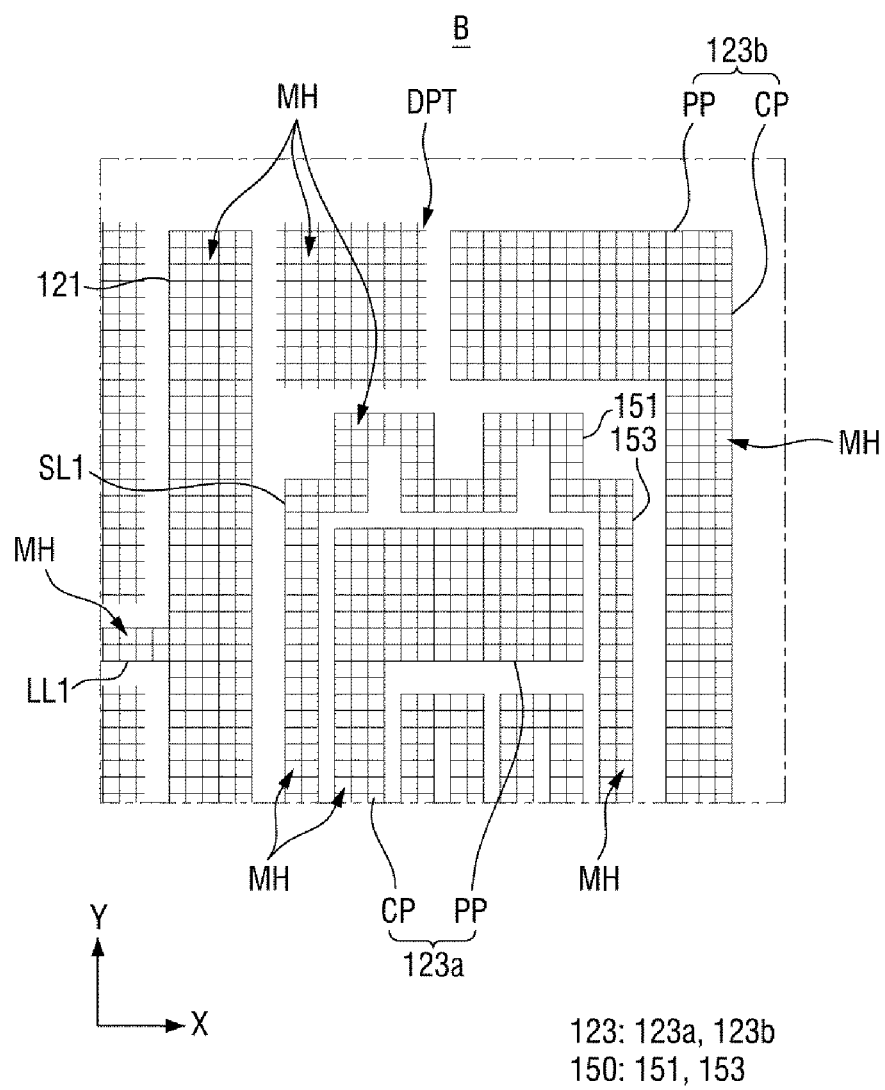
FIG. 21 is an enlarged plan view of portion B of FIG. 17 according to another exemplary embodiment.
Figure 22:
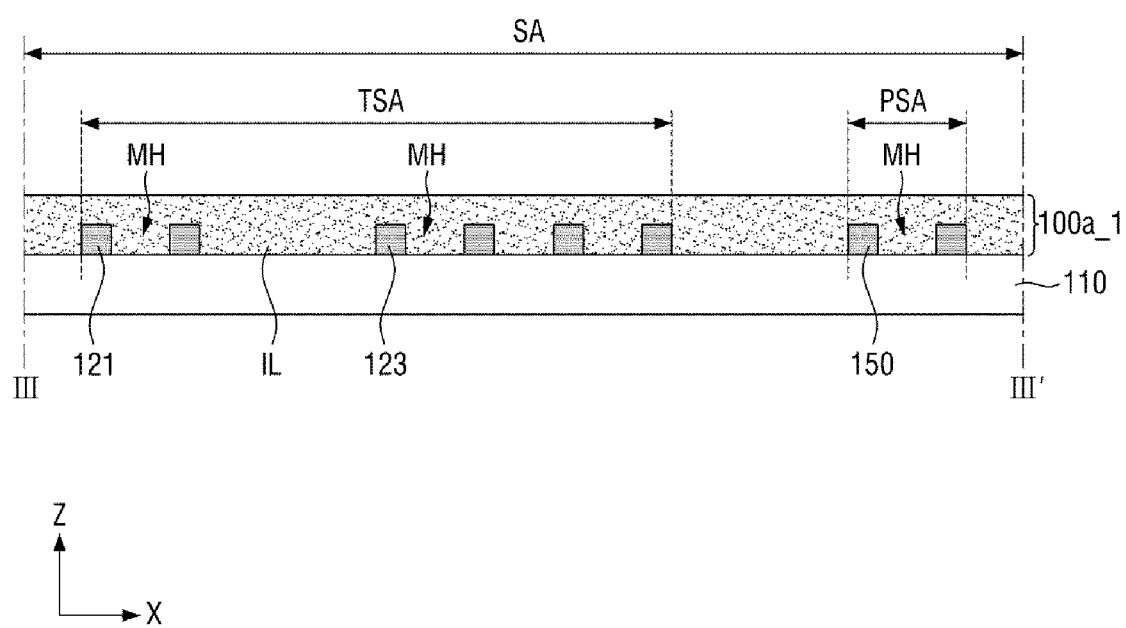
FIG. 22 is a cross-sectional view taken along a sectional line of FIG. 17.

FIG. 17 is a plan view of a touch sensor according to another exemplary embodiment, and FIG. 18 is a plan view of a touch sensor according to another exemplary embodiment. FIG. 19 is a block diagram of the touch sensor shown in FIG. 17. FIG. 20 is an enlarged plan view of portion B of FIG. 17 according to an exemplary embodiment. FIG. 21 is an enlarged plan view of portion B of FIG. 17 according to another exemplary embodiment. FIG. 22 is a cross-sectional view taken along a sectional line of FIG. 17. The exemplary embodiment of FIGS. 17, 18, 19, 20, 21, and 22 is different from the exemplary embodiment of FIGS. 4, 5, 6, 7, 8, 9, 10, and 11 in the structure of the electrode member and the shape of the strain gauge. A description overlapping with the exemplary embodiment with reference to FIGS. 4, 5, 6, 7, 8, 9, 10, and 11 will be omitted, and differences will be mainly described.

Referring to FIGS. 17 and 22, electrode members 120_1 for detecting a touch input may be disposed in the sensing area SA of a sensor portion 100_2, and the electrode members 120_1 may be arranged to be spaced apart from each other in the first direction (X-axis direction). For example, the electrode members 120_1 may be disposed in the first electrode column CD1, the second electrode column CD2, and the third electrode column CD3, respectively. For simplicity of description, the following description will be given with respect to the electrode members 120_1 disposed in the first electrode column CD1.

A first electrode member 121 may have a bar shape extending in the second direction (Y-axis direction). In addition, the plurality of first electrode members 121 may be arranged to be spaced apart from each other in the second direction (Y-axis direction). For example, the first electrode members 121 may be disposed in the first electrode row RD1, the second electrode row RD2, and the third electrode row RD3, respectively.

A second electrode member 123 may include a first unit 123a and a second unit 123b extending along the second direction (Y-axis direction), and the second electrode members 123 may be arranged to be spaced apart from each other in the first direction (X-axis direction). The first electrode members 121 and the second electrode members 123 may be spaced apart from each other and electrically isolated from each other.

Each of the first unit 123a and the second unit 123b may include a connection portion CP connecting the protrusion portions PP and the protrusion portions PP in the second direction (Y-axis direction). The protrusion portions PP of the first unit 123a and the protrusion portions PP of the second unit 123b may be spaced apart from each other by a predetermined distance in the second direction (Y-axis direction) and may be alternately arranged. The connection portion CP of the first unit 123a may connect the protrusion portions PP of the first unit 123a at one distal end of the protrusion portions PP of the first unit 123a, and the connection portion CP of the second unit 123b may connect the protrusion portions PP of the second unit 123b at the other distal end of the protrusion portions PP of the second unit 123b. Thus, the protrusion portion PP of the first unit 123a and the protrusion portion PP of the second unit 123b may be located between the connection portion CP of the first unit 123a and the connection portion CP of the second unit 123b.

Each of the first electrode members 121 and the second electrode members 123 may be electrically connected to the controller 200. In some exemplary embodiments, the second electrode member 123 may be a driving electrode member that receives the driving signal Ts for touch detection from the controller 200, and the first electrode member 121 may be a sensing electrode member that outputs the sensing signal Rs for touch detection to the controller 200. Further, each of the first electrode members 121 and the second electrode members 123 may have a mesh structure for transmitting light outputted from the display area DA of the display panel 300. For example, each of the first electrode members 121 and the second electrode members 123 may include a plurality of mesh holes MH.

The sensing area SA of the sensor portion 100 may be provided with the strain gauge 150 for detecting the touch pressure. The strain gauge 150 may be disposed between the electrode members 120_1. In addition, the strain gauge 150 may be disposed on the same layer as the electrode members 120_1, and the strain gauge 150 may not overlap the electrode members 120_1 in the thickness direction.

The strain gauge 150 may include a resistance line 151 disposed between the protrusion portion PP of the first unit 123a and the protrusion portion PP of the second unit 123b, and a connection line 153 connecting the adjacent resistance lines 151. The resistance line 151 may be shaped to include two or more bent portions and portions extending in the first direction (X-axis direction) and a direction opposite to the first direction (X-axis direction). However, the present disclosure is not limited thereto, and the resistance line 151 may have various shapes as described above.

The strain gauge 150 may have a mesh structure similarly to the first electrode members 121 and the second electrode members 123. For example, the strain gauge 150 may include a plurality of mesh holes MH.

The strain gauge 150 may change its resistance value by varying its length or cross-sectional area when a force is externally applied.

The insulating layer IL may be disposed on the first electrode members 121 and the second electrode members 123, the connection line 153, and the resistance line 151. For example, the insulating layer IL may cover the electrode members 120, the connection line 153, and the resistance line 151. The strain gauge 150 may be electrically isolated from the first electrode members 121 and the second electrode members 123. The sensing area SA may include a touch position sensing area TSA where the first electrode members 121 and the second electrode members 123 are disposed and a touch pressure sensing area PSA where the resistance line 151 is disposed.

The touch driver 210 may provide the driving signal Ts for detecting a touch input to the second electrode members 123. The touch detector 230 may receive the sensing signal Rs corresponding to the driving signal Ts from the first electrode members 121 and detect the presence/absence and/or position of the touch input. The sensing signal Rs may be an amount of mutual capacitance change occurring between the first electrode members 121 and the second electrode members 123.

More specifically, when the touch input is generated, the capacitance changes at the point where the touch input is provided or at the periphery thereof. The touch detector 230 may receive a change amount of mutual capacitance between the first electrode members 121 and the second electrode members 123 as a sensing signal Rs to determine the presence/absence and/or position of the touch input.

Further, the touch pressure can be detected based on the resistance value change of the strain gauge 150 through the pressure detector 250.

The sensor portion 100_2 may include first wiring line LL1 and second wiring line LL2 and a first signal line SL1 and a second signal line SL2. For example, the sensor portion 100_2 may include a first wiring line LL1 connected to each of the first electrode members 121, a second wiring line LL2 connected to each of the second electrode members 123, and a first signal line SL1 and a second signal line SL2 connected to the resistance line 151.

One distal ends of the first wiring line LL1 may be connected to the first electrode members 121 and one distal ends of the second wiring line LL2 may be connected to the second electrode members 123, respectively. More specifically, the second wiring line LL2 may include a second-first wiring line LL2_1 and a second-second wiring line LL2_2. One distal end of the second-first wiring line LL2_1 may be connected to the first unit 123a and one distal end of the second-second wiring line LL2_2 may be connected to the second unit 123b. The other distal ends of the first wiring line LL1 and the second wiring line LL2 may be connected to the pad portion TP.

One distal end of the first signal line SL1 may be connected to one distal end of the strain gauge 150 and one distal end of the second signal line SL2 may be connected to the other distal end of the strain gauge 150. More specifically, the first signal line SL1 may be connected to one distal end (opposite to the other distal end to which the connection line is connected) of the resistance line 151 disposed on the uppermost side arranged along the second direction (Y-axis direction). The second signal line SL2 may be connected to the other distal end (opposite to one distal end to which the connection line is connected) of the resistance line 151 disposed first along the second direction (Y-axis direction). Further, the other distal ends of the first signal line SL1 and the second signal line SL2 may be connected to the pad portion TP.

The first and second wiring lines LL1 and LL2 and the first and second signal lines SL1 and SL2 may be disposed on the same layer as the electrode members 120_1, the connection line 153, and the resistance line 151. The first and second wiring lines LL1 and LL2 and the first and second signal lines SL1 and SL2 may be formed of the same material and by the same process as the electrode members 120_1, the connection line 153, and the resistance line 151 and may have a mesh structure.

The pad portion TP includes a plurality of pads arranged along the first direction (X-axis direction), and the first and second wiring lines LL1 and LL2 and the first and second signal lines SL1 and SL2 may be connected to the respective pads. Further, as shown in FIG. 17, the pad portion TP may include a signal line connection pattern CNL that electrically connects the adjacent strain gauges 150 to each other. Since the arrangement structure of the signal line connection pattern CNL is the same as in FIGS. 4 and 5, a redundant description will be omitted.

Figure 23:
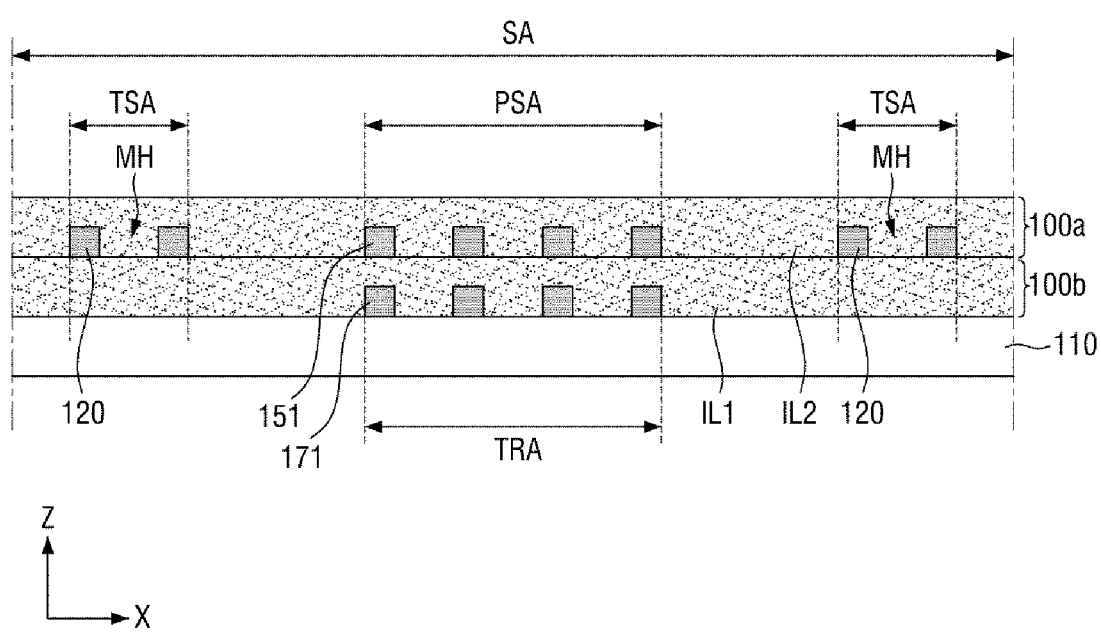
FIG. 23 is a cross-sectional view of a touch sensor according to another exemplary embodiment.
Figure 24:
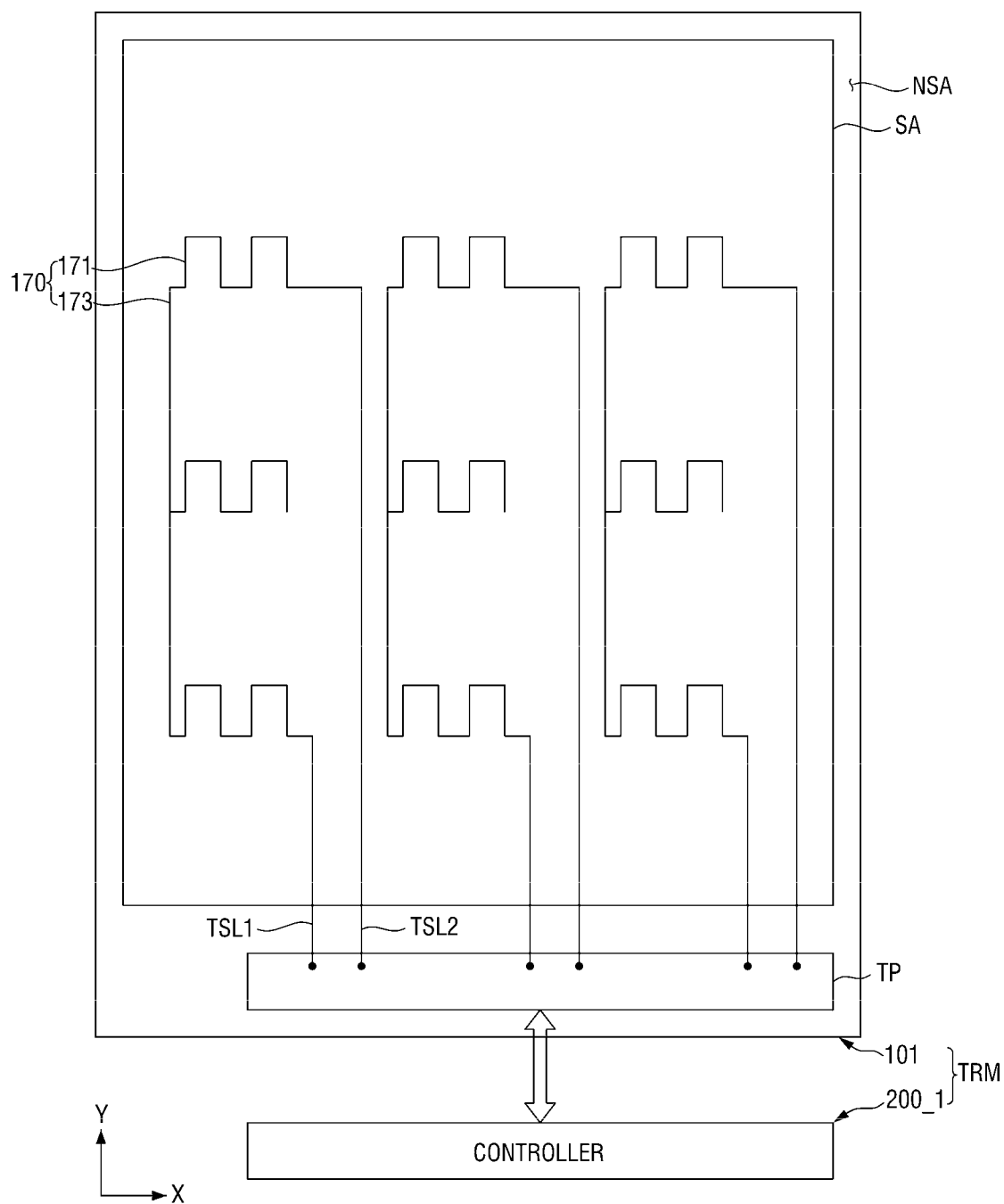
FIG. 24 is a plan view of a temperature compensation module of a touch sensor according to another exemplary embodiment.

FIG. 23 is a cross-sectional view of a touch sensor according to another exemplary embodiment. FIG. 24 is a plan view of a temperature compensation module of a touch sensor according to another exemplary embodiment. The exemplary embodiment of FIGS. 23 and 24 is different from the exemplary embodiment of FIGS. 1, 2, 3, 4, 5, 6, 7, 8, 9, 10, 11, 12, 13, 14, 15, 16, 17, 18, 19, 20, 21, and 22 in that the touch sensor TSM further includes a temperature compensation module TRM. A description overlapping with the exemplary embodiment with reference to FIGS. 1, 2, 3, 4, 5, 6, 7, 8, 9, 10, 11, 12, 13, 14, 15, 16, 17, 18, 19, 20, 21, and 22 will be omitted, and differences will be mainly described.

Referring to FIGS. 23 and 24, the temperature compensation module TRM may include a temperature compensation portion 101 and a controller 200_1. The temperature compensation portion 101 may be disposed so as to overlap the sensor portion 100 (see FIG. 1). The area where the temperature compensating portion 101 senses and compensates the temperature may correspond to the sensing area SA where the sensor portion 100 can sense the touch input. Further, the temperature compensating portion 101 may be disposed between the display panel 300 (see FIG. 1) and the sensor portion 100 (see FIG. 1). That is, the sensing area SA may include a touch position sensing area TSA in which the electrode members 120 are disposed, a touch pressure sensing area PSA in which the resistance line 151 is disposed, and a temperature compensation area TRA in which a temperature compensating resistance line 171 is disposed.

The temperature compensation portion 101 includes a temperature compensating pattern 170 and temperature compensating signal lines TSL1 and TSL2 connected thereto. The temperature compensating pattern 170 and the temperature compensating signal lines TSL1 and TSL2 connected thereto may be disposed on the base layer 110, and may have a mesh structure.

The temperature compensating pattern 170 may be disposed corresponding to the strain gauge 150 of FIG. 4. For example, the temperature compensating pattern 170 and the strain gauge 150 may overlap each other in the thickness direction.

The temperature compensating pattern 170 may include a temperature compensating resistance line 171 and a temperature compensating connection line 173.

The temperature compensating resistance line 171 may have the same shape as the resistance line 151 of the strain gauge 150. For example, the temperature compensating resistance line 171 may be bent to have a predetermined pattern corresponding to the resistance line 151. However, the present disclosure is not limited thereto, and the shape of the temperature compensating resistance line 171 may be different from that of the resistance line 151. However, even if the shape of the temperature compensating resistance line 171 is different from that of the resistance line 151, the resistance value of the temperature compensating resistance line 171 may be the same as the resistance value of the resistance line 151. The temperature compensating connection line 173 may electrically connect the temperature compensating resistance lines 171 disposed along the second direction (Y-axis direction) to each other.

A first insulating layer IL1 may be disposed on the first temperature compensating pattern 170, and the first insulating layer IL1 may provide a space in which the sensing pattern 100a (see FIG. 4) of the sensor portion 100 (see FIG. 1) is disposed. It is needless to say that the sensing pattern 100a may employ the sensing pattern 100a described with reference to FIGS. 1, 2, 3, 4, 5, 6, and 7 or the sensing pattern 100a described with reference to FIGS. 18, 19, 20, 21, and 22. The first insulating layer IL1 may be embodied as a multilayer including at least one organic film and at least one inorganic film, or may be embodied as a single layer including a combination of organic and inorganic materials.

The temperature compensating signal lines TSL1 and TSL2 may include a first temperature compensating signal line TSL1 connected to one distal end of the temperature compensating pattern 170 and a second temperature compensating signal line TSL2 connected to the other distal end of the temperature compensating pattern 170.

The temperature compensating signal lines TSL1 and TSL2 may be connected to the pad portion TP to transmit signals to the controller 200_1.

Referring to FIGS. 1, 2, 3, 4, 5, 6, and to 7, when the touch input of the user is applied to the touch sensor TSM, the resistance value of the strain gauge 150 may be changed according to the intensity of the touch input. In addition, the resistance value of the strain gauge 150 may be changed according to the body temperature of the user or the temperature change of the lower display panel 300. Therefore, since a portion of the change amount of the resistance value of the first strain gauge 150 based on the temperature change is independent of the intensity of the user's touch input, it may act as noise.

According to the present exemplary embodiment, the temperature compensating pattern 170 is overlappingly disposed below the corresponding strain gauge 150. When the touch input of the user is generated in the touch sensor TSM, the resistance value of the strain gauge 150 changes according to the user's body temperature or the temperature change of the lower display panel 300. The temperature compensating pattern 170 also changes its resistance value by the user's body temperature or heat transmitted from the lower display panel 300. Therefore, it is possible to compensate the component based on the temperature change in the change amount of the resistance value of the strain gauge 150 by using the resistance value change generated based on the temperature change in the temperature compensating pattern 170.

Figure 25:
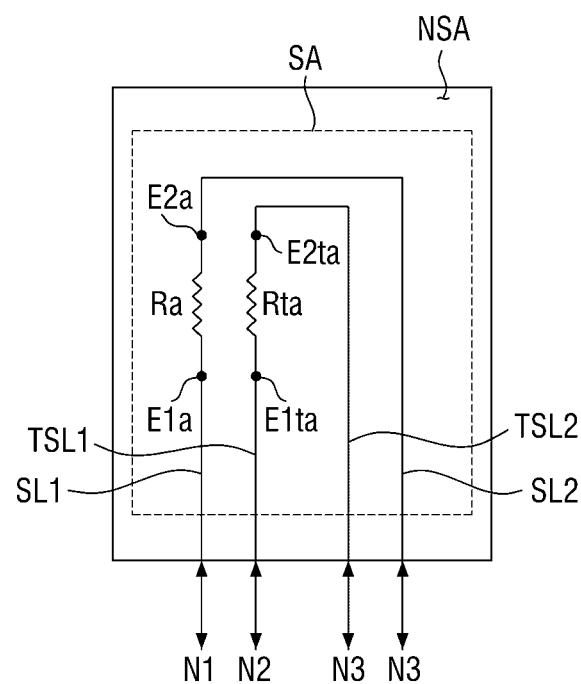
FIG. 25 is a diagram schematically showing an arrangement of signal lines, a temperature compensating pattern, and a strain gauge of a touch sensor and a connection relationship with a Wheatstone bridge circuit portion according to another exemplary embodiment.
Figure 26:
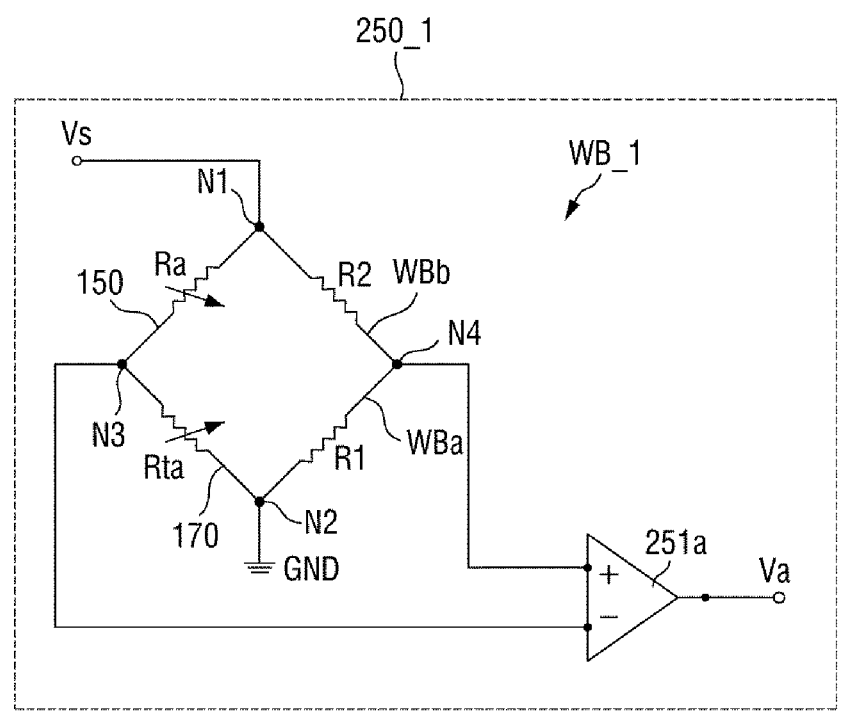
FIG. 26 is a diagram schematically showing a Wheatstone bridge circuit portion electrically connected to a temperature compensating pattern and a strain gauge of a touch sensor according to still another exemplary embodiment.

FIG. 25 is a diagram schematically showing an arrangement of signal lines, a temperature compensating pattern and a strain gauge of a touch sensor and a connection relationship with a Wheatstone bridge circuit portion according to another exemplary embodiment. FIG. 26 is a diagram schematically showing a Wheatstone bridge circuit portion electrically connected to a temperature compensating pattern and a strain gauge of a touch sensor according to still another exemplary embodiment. The exemplary embodiment of FIGS. 25 and 26 is different from the exemplary embodiment of FIGS. 15 and 16 in that a Wheatstone bridge circuit portion WB_1 of a pressure detector 250_1 includes a temperature compensating pattern 170. A description overlapping with the exemplary embodiment with reference to FIGS. 15 and 16 will be omitted, and differences will be mainly described.

One distal end E1a of the strain gauge 150 may be electrically connected to the first node N1 via the first signal line SL1, and the other distal end E2a of the strain gauge 150 may be connected to the first output node N3 via the second signal line SL2.

One distal end E1ta of the first temperature compensating pattern 170 may be connected to the second node N2 via the first temperature compensating signal line TSL1, and the other distal end E2ta of the first temperature compensating pattern 170 may be connected to the first output node N3 via the second temperature compensating signal line TSL2. The strain gauge 150, the temperature compensating pattern 170, the first resistor WBa, and the second resistor WBb may be connected to each other to form a Wheatstone bridge.

In some exemplary embodiments, in a state where a touch input is not applied, the product of the resistance value Ra of the strain gauge 150 and the resistance value R1 of the first resistor WBa may be substantially equal to the product of the resistance value Rta of the temperature compensating pattern 170 and the resistance value R2 of the second resistor WBb.

When a touch input occurs, the resistance value Ra of the strain gauge 150 includes a component (hereinafter, referred to as a "first pressure resistance component") which changes with shape deformation according to the touch pressure and a component (hereinafter, referred to as a "first temperature resistance component") which changes based on a temperature change. Also, when a touch input occurs, the resistance value Rta of the temperature compensating pattern 170 includes a component (hereinafter, referred to as a "second pressure resistance component") which changes with shape deformation according to the touch pressure and a component (hereinafter, referred to as a "second temperature resistance component" which changes based on a temperature change. The second pressure resistance component may be negligibly small or may exhibit a significant difference from the first pressure resistance component. Since the strain gauge 150 and the temperature compensating pattern 170 are not arranged to face each other diagonally in the Wheatstone bridge circuit portion, the second temperature resistance component of the temperature compensating pattern 170 may compensate or offset the first temperature resistance component of the strain gauge 150, thereby more sensitively detecting the touch pressure.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensor comprising:
 a base layer;
 a plurality of electrode members disposed on the base layer, the plurality of electrode members configured to sense a touch; and
 a plurality of strain gauges disposed on the base layer, the plurality of strain gauges arranged in a matrix form and configured to sense a pressure of a touch input,
 wherein the plurality of electrode members and the strain gauge are disposed in a same layer, and
 the plurality of strain gauges are electrically isolated from, and without being connected to, the plurality of electrode members.

2. The touch sensor of claim 1, wherein the plurality of electrode members are arranged in an island shape, and
 wherein the strain gauge is spaced apart from each of the plurality of electrode members in a plan view.

3. The touch sensor of claim 2, wherein the strain gauge comprises at least one resistance line, the at least one resistance line located between the plurality of electrode members in the plan view.

4. The touch sensor of claim 3, wherein the strain gauge comprises a first resistance line and a second resistance line disposed to be spaced apart from each other in a first direction, and
 wherein the strain gauge further comprises a connection line electrically connecting one distal end of the first resistance line to one distal end of the second resistance line.

5. The touch sensor of claim 4, wherein the connection line is located between the plurality of electrode members which are spaced apart in a second direction intersecting the first direction.

6. The touch sensor of claim 5, further comprising:
 a pad portion comprising a plurality of pads;
 a first signal line electrically connecting the other distal end of the first resistance line to the pad portion; and
 a second signal line electrically connecting the other distal end of the second resistance line to the pad portion,
 wherein the first signal line and the second signal line extend in the first direction and are separated from each other in the second direction.

7. The touch sensor of claim 6, further comprising a temperature compensation portion disposed between the base layer and the strain gauge,
 wherein the temperature compensation portion comprises a temperature compensating resistance line overlapping the at least one resistance line in a thickness direction.

8. The touch sensor of claim 7, further comprising an insulating layer disposed between the temperature compensating resistance line and the at least one resistance line,
 wherein the temperature compensating resistance line has the same shape as that of the at least one resistance line.

9. The touch sensor of claim 8, further comprising a Wheatstone bridge circuit portion electrically connected to the strain gauge, the Wheatstone bridge circuit portion comprising: a first node to which a driving voltage is applied; a second node connected to ground; a first output node; and a second output node,
 wherein one distal end of the strain gauge is electrically connected to the first node, and the other distal end of the strain gauge is electrically connected to the first output node.

10. The touch sensor of claim 9, wherein the Wheatstone bridge circuit portion is electrically connected to a temperature compensating pattern, and one distal end of the temperature compensating pattern is electrically connected to one of the first output node and the first node.

11. The touch sensor of claim 10, wherein a resistance value of the temperature compensating pattern is configured to have a resistance value equal to that of the strain gauge in response to the touch input not being applied.

12. The touch sensor of claim 1, wherein the touch sensor is configured to sense a position of the touch input based on a self-capacitance change in the plurality of electrodes generated in response to a touch input, and
 wherein the touch sensor is configured to sense a pressure of the touch input based on a resistance value change of the strain gauge generated in response to the touch input.

13. The touch sensor of claim 1, wherein the plurality of electrode members comprises a plurality of first electrode members which is a sensing electrode and a second electrode member which is a driving electrode,
 wherein the plurality of first electrode members are spaced apart in a first direction, and
 wherein the second electrode member comprises a first unit and a second unit which extend in the first direction and are spaced apart in a second direction perpendicular to the first direction.

14. The touch sensor of claim 13, wherein the first unit comprises:
 a first connection portion which extends in the first direction; and
 a first protrusion portion which protrudes from the first connection portion in the second direction,
 wherein the second unit comprises:
 a second connection portion which extends in the first direction; and
 a second protrusion portion which protrudes from the second connection portion in a third direction opposite to the second direction, and wherein the first protrusion portion and the second protrusion portion are alternately arranged in the first direction, and the first protrusion portion and the second protrusion portion are spaced apart in the first direction.

15. The touch sensor of claim 14, wherein the first protrusion portion and the second protrusion portion overlap each other in the first direction.

16. The touch sensor of claim 15, wherein the strain gauge comprises at least one resistance line, the at least one resistance line being located between the first protrusion portion and the second protrusion portion, and spaced apart from the first and second protrusion portions.

17. The touch sensor of claim 16, further comprising a temperature compensation portion disposed between the base layer and the strain gauge, the temperature compensation portion comprising a temperature compensating resistance line, and
    wherein the temperature compensating resistance line overlaps the at least one resistance line in a thickness direction.

18. The touch sensor of claim 17, further comprising an insulating layer disposed between the temperature compensating resistance line and the at least one resistance line,
    wherein the temperature compensating resistance line has the same shape as that of the at least one resistance line.

19. The touch sensor of claim 13, wherein the touch sensor is configured to sense a position of the touch input based on a mutual capacitance change between the plurality of first electrode members and the second electrode member generated in response to the touch input, and
    wherein the touch sensor is configured to sense a pressure of the touch input based on a resistance value change of the strain gauge generated in response to the touch input.

20. The touch sensor of claim 1, wherein the same layer comprises a single layer.

21. A display device comprising:
    a base substrate;
    a light emitting element disposed on the base substrate;
    a thin film encapsulation layer disposed on the light emitting element;
    a plurality of first touch electrodes disposed on the thin film encapsulation layer and electrically connected to each other along a first direction, each of the plurality of first touch electrodes comprising a first opening;
    a plurality of electrode members disposed on the thin film encapsulation layer and configured to sense a touch; and
    at least one strain gauge disposed on the same layer as the plurality of electrode members and configured to sense a pressure,
    wherein each of the plurality of electrode members is disposed on the same layer, and each of the plurality of electrode members and the at least one strain gauge comprises mesh holes.

* * * * *